United States Patent
Yang et al.

(10) Patent No.: US 12,022,481 B2
(45) Date of Patent: Jun. 25, 2024

(54) METHOD AND DEVICE FOR TRANSMITTING AND RECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 467 days.

(21) Appl. No.: 17/278,172

(22) PCT Filed: Sep. 23, 2019

(86) PCT No.: PCT/KR2019/012355
§ 371 (c)(1),
(2) Date: Mar. 19, 2021

(87) PCT Pub. No.: WO2020/060367
PCT Pub. Date: Mar. 26, 2020

(65) Prior Publication Data
US 2021/0352704 A1  Nov. 11, 2021

Related U.S. Application Data

(60) Provisional application No. 62/875,988, filed on Jul. 19, 2019.

(30) Foreign Application Priority Data

Sep. 21, 2018 (KR) ........................ 10-2018-0114489
Mar. 29, 2019 (KR) ........................ 10-2019-0036707
(Continued)

(51) Int. Cl.
*H04W 72/23* (2023.01)
*H04L 1/1607* (2023.01)
(Continued)

(52) U.S. Cl.
CPC .......... *H04W 72/23* (2023.01); *H04L 1/1671* (2013.01); *H04W 16/14* (2013.01); *H04W 72/21* (2023.01)

(58) Field of Classification Search
CPC ..... H04W 72/23; H04W 16/14; H04W 72/21; H04L 1/1671; H04L 1/1822;
(Continued)

(56) References Cited

U.S. PATENT DOCUMENTS

2016/0295561 A1 * 10/2016 Papasakellariou .... H04W 72/23
2018/0145796 A1    5/2018 Liang et al.
2018/0167932 A1 *  6/2018 Papasakellariou .... H04L 5/0094

FOREIGN PATENT DOCUMENTS

CN      108432316 A  *  8/2018  ........... H04L 1/1812
KR     1020140008379        1/2014
(Continued)

OTHER PUBLICATIONS

PCT International Search Report and Written Opinion in International Appln. No. PCT/KR2019/012355, dated Jan. 3, 2020, 15 pages (with English translation).

*Primary Examiner* — Tejis Daya
*Assistant Examiner* — Oladiran Gideon Olaleye
(74) *Attorney, Agent, or Firm* — Fish & Richardson P.C.

(57) ABSTRACT

A wireless communication system and, particularly, a method and a device therein, for receiving a first downlink control information, DCI, including a counter downlink assignment index, counter-DAI, and slot group indication information, wherein the counter-DAI indicates a scheduling order in a slot group, and the slot group indication information indicates a first slot group from among a plurality of slot groups; receiving downlink data on the basis of the first DCI; receiving a second DCI including a total-DAI and requiring acknowledgment/negative acknowledgement, A/N, feedback for the first slot group from among the
(Continued)

plurality of slot groups, wherein the total-DAI indicates the total number of schedulings in a slot group; and transmitting uplink control information including A/N information about the first slot group on the basis of the counter-DAI and the total-DAI.

20 Claims, 13 Drawing Sheets

(30) Foreign Application Priority Data

Aug. 15, 2019 (KR) .................. 10-2019-0100018
Aug. 23, 2019 (KR) .................. 10-2019-0103803

(51) Int. Cl.
*H04W 16/14* (2009.01)
*H04W 72/21* (2023.01)

(58) Field of Classification Search
CPC ... H04L 1/1864; H04L 5/0044; H04L 5/0053; H04L 5/0094; H04L 1/1854
USPC ........................................................ 370/329
See application file for complete search history.

(56) References Cited

FOREIGN PATENT DOCUMENTS

| | | | | |
|---|---|---|---|---|
| KR | 1020180046372 | | 5/2018 | |
| KR | 1020180091527 | | 8/2018 | |
| WO | WO-2014067232 A1 * | | 5/2014 | ........... H04L 5/0035 |
| WO | WO2016108658 | | 7/2016 | |
| WO | WO-2017043916 A1 * | | 3/2017 | ........... H04L 1/1812 |
| WO | WO-2018004268 A1 * | | 1/2018 | ............... H04L 1/16 |
| WO | WO-2018128493 A1 * | | 7/2018 | ............... B41J 5/105 |

* cited by examiner (a) Carrier aggregation between L-band and U-band (b) standalone U-band(s)

(a) t-A/N without DAI signaling (b) t-A/N with DAI signaling

METHOD AND DEVICE FOR TRANSMITTING AND RECEIVING WIRELESS SIGNAL IN WIRELESS COMMUNICATION SYSTEM

CROSS-REFERENCE TO RELATED APPLICATIONS

This application is the National Phase of PCT International Application No. PCT/KR2019/012355, filed on Sep. 23, 2019, which claims priority under 35 U.S.C. 119(a) to Korea Patent Application Nos. 10-2018-0114489, filed on Sep. 21, 2018, 10-2019-0036707, filed on Mar. 29, 2019, 10-2019-0100018, filed on Aug. 15, 2019, 10-2019-0103803, filed on Aug. 23, 2019 and U.S. Provisional Application No. 62/875,988. The disclosures of the prior applications are incorporated by reference in their entirety.

TECHNICAL FIELD

The present disclosure relates to a wireless communication system and, more particularly, to a method and device for transmitting and receiving wireless signals.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

The object of the present disclosure is to provide a method of efficiently transmitting and receiving wireless signals and device therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

In one aspect of the present disclosure, a method of transmitting a signal by a wireless device in a wireless communication system is provided. The method may include: receiving first downlink control information (DCI) including a counter downlink assignment index (counter-DAI) and slot group indication information, wherein the counter-DAI indicates a scheduling order in a slot group and the slot group indication information indicates a first slot group among a plurality of slot groups; receiving downlink data based on the first DCI; receiving second DCI including a total-DAI and requesting acknowledgment/negative acknowledgement (A/N) feedback for the first group among the plurality of slot groups, wherein the total-DAI indicates the total number of times that scheduling is performed in a slot group; and transmitting uplink control information including A/N information for the first slot group based on the counter-DAI and the total-DAI.

In another aspect of the present disclosure, a wireless device for use in a wireless communication system is provided. The wireless device may include a memory and a processor. The processor may be configured to: receive first DCI including a counter-DAI and slot group indication information, wherein the counter-DAI indicates a scheduling order in a slot group and the slot group indication information indicates a first slot group among a plurality of slot groups; receive downlink data based on the first DCI; receive second DCI including a total-DAI and requesting A/N feedback for the first group among the plurality of slot groups, wherein the total-DAI indicates the total number of times that scheduling is performed in a slot group; and transmit uplink control information including A/N information for the first slot group based on the counter-DAI and the total-DAI.

Preferably, the size of the A/N information for the first slot group may be determined based on the total-DAI, and A/N information may be arranged in the order of values of the counter-DAI in the A/N information for the first slot group.

Preferably, the second DCI may include DCI scheduling a physical downlink shared channel (PDSCH), and the second DCI may include first information about the index of a slot group including the PDSCH and second information indicating that the first slot group is a slot group for which A/N feedback is required.

Preferably, the slot group indicated by the first information may be different from the first slot group.

Preferably, the second DCI may further include a total-DAI for the slot group including the PDSCH.

Preferably, the DCI may further include third information about the transmission time of the uplink control information.

Preferably, the uplink control information may be transmitted in an unlicensed band (U-band).

Preferably, the wireless device may include an autonomous driving vehicle configured to communicate at least with a terminal, a network, and another autonomous driving vehicle other than the wireless device.

According to the present disclosure, wireless signal transmission and reception may be efficiently performed in a wireless communication system.

It will be appreciated by persons skilled in the art that the effects that could be achieved with the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the invention, illustrate embodiments of the present disclosure and together with the description serve to explain the principle of the present disclosure. In the drawings.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). $3^{rd}$ generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NR or New RAT in the present disclosure.

While the following description is given in the context of a 3GPP communication system (e.g., NR) for clarity, the technical spirit of the present disclosure is not limited to the 3GPP communication system.

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
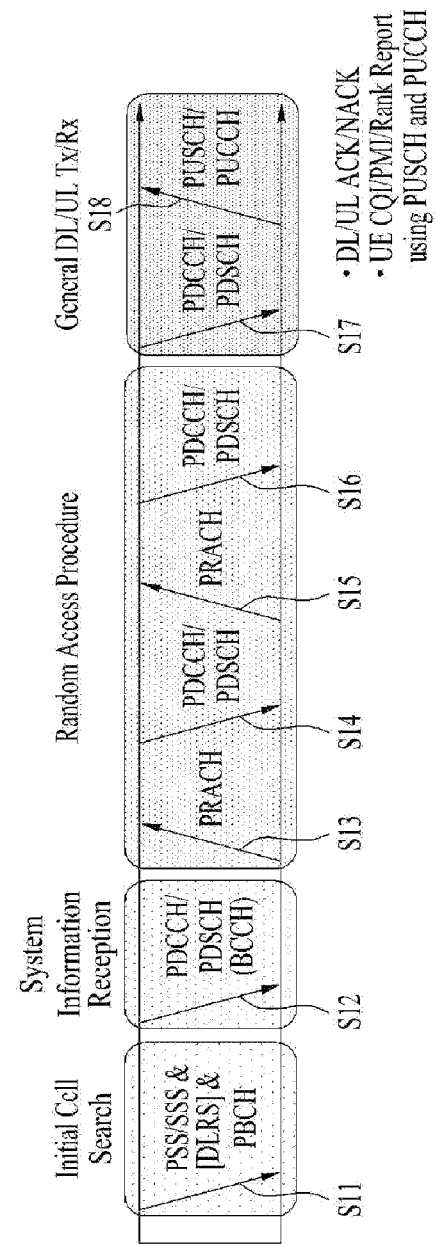
FIG. 1 illustrates physical channels and a general signal transmission method using the physical channels in a $3^{rd}$ generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S101). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information in the PDCCH (S102).

Subsequently, to complete connection to the BS, the UE may perform a random access procedure with the BS (S103 to S106). Specifically, the UE may transmit a preamble on a physical random access channel (PRACH) (S103) and may receive a PDCCH and a random access response (RAR) for the preamble on a PDSCH corresponding to the PDCCH (S104). The UE may then transmit a physical uplink shared channel (PUSCH) by using scheduling information in the RAR (S105), and perform a contention resolution procedure including reception of a PDCCH and a PDSCH signal corresponding to the PDCCH (S106).

After the above procedure, the UE may receive a PDCCH and/or a PDSCH from the BS (S107) and transmit a physical uplink shared channel (PUSCH) and/or a physical uplink control channel (PUCCH) to the BS (S108), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
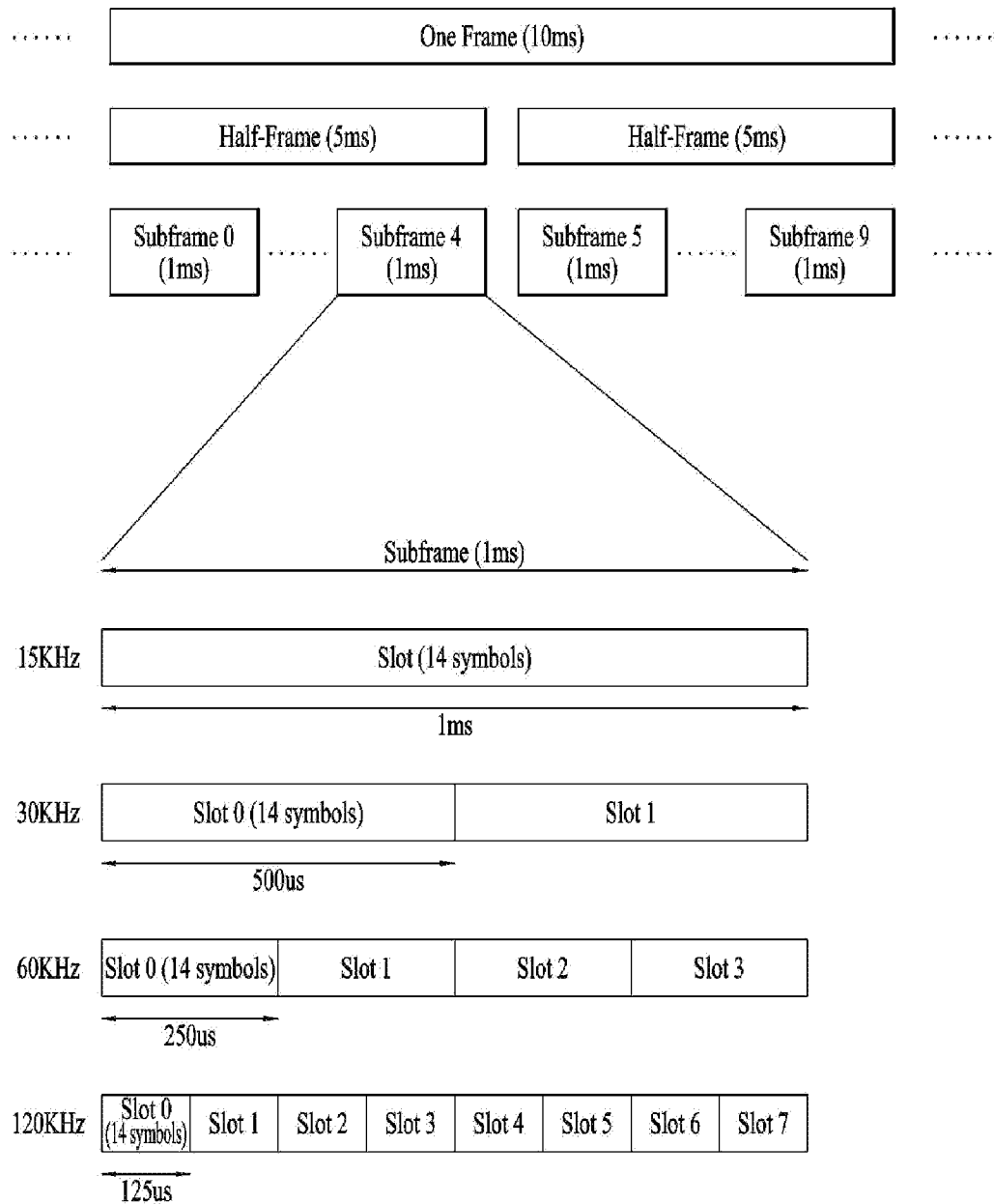
FIG. 2 illustrates a radio frame structure.

FIG. 2 illustrates a radio frame structure. In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame, u}_{slot}$: number of slots in a frame
* $N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners.

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells. A symbol may include an OFDM symbol (or CP-OFDM symbol) and an SC-FDMA symbol (or discrete Fourier transform-spread-OFDM (DFT-s-OFDM) symbol).

Figure 3:
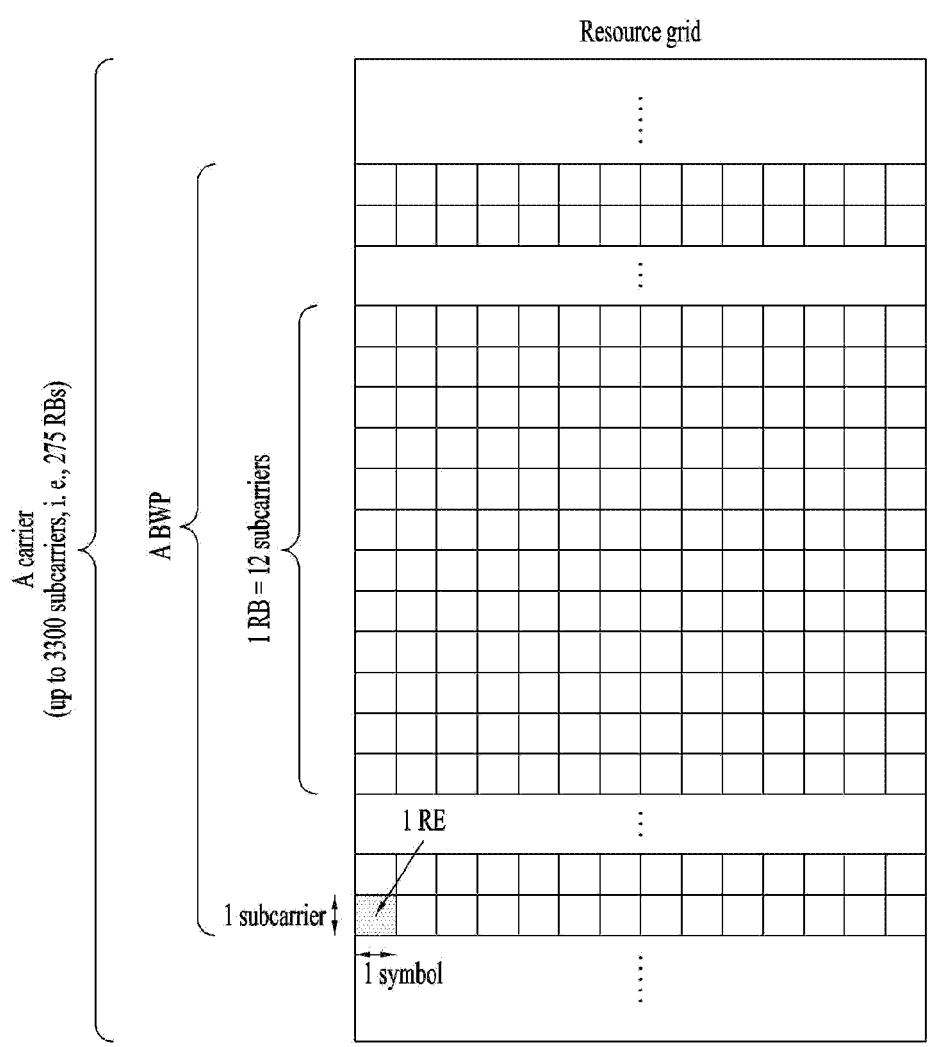
FIG. 3 illustrates a resource grid during the duration of a slot.

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
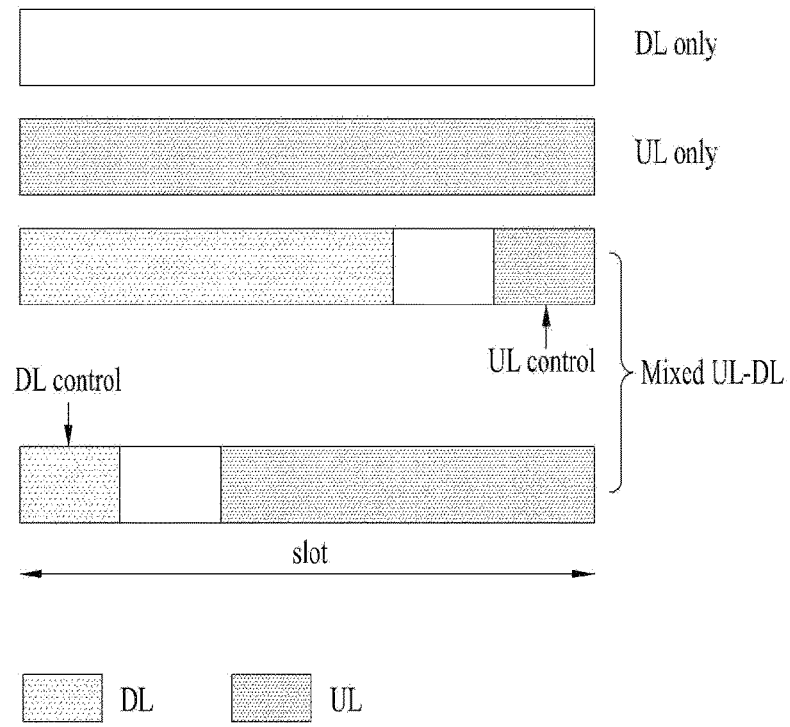
FIG. 4 illustrates a self-contained slot structure.

FIG. 4 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

Figure 5:
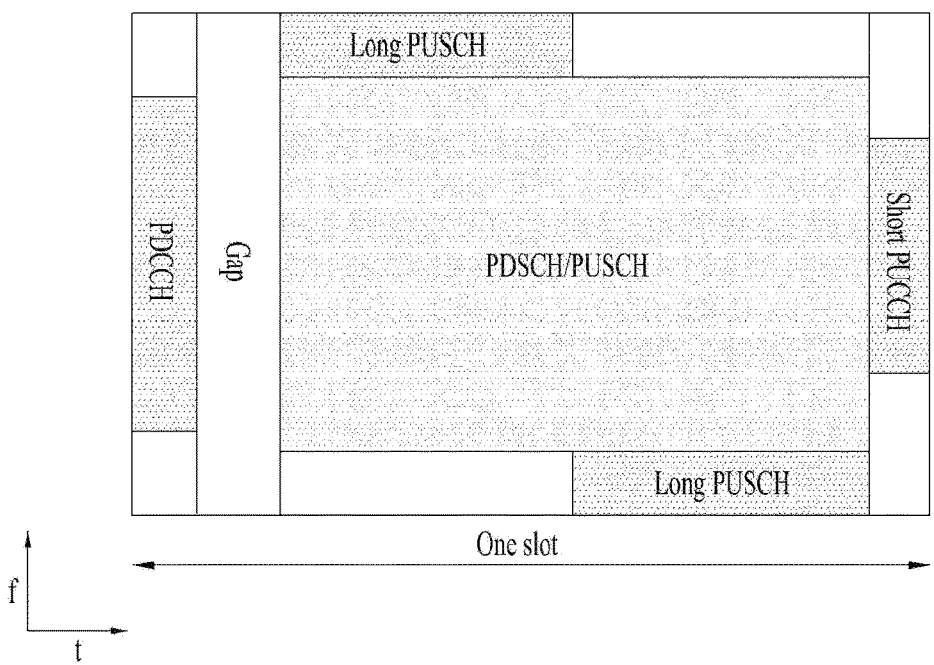
FIG. 5 illustrates mapping of physical channels in a self-contained slot.

1. DL only configuration
2. UL only configuration
3. Mixed UL-DL configuration
   DL region+Guard period (GP)+UL control region
   DL control region+GP+UL region
   DL region: (i) DL data region, (ii) DL control region+ DL data region
   UL region: (i) UL data region, (ii) UL data region+UL control region FIG. 5 illustrates mapping of physical channels in a self-contained slot. The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

Now, a detailed description will be given of physical channels.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH may include 1, 2, 4, 8, or 16 control channel elements (CCEs) depending on the aggregation level (AL). The CCE is a logical allocation unit for providing the PDCCH with a predetermined coding rate based on the state of a radio channel. The PDCCH is transmitted in a control resource set (CORESET). The CORESET is defined as a set of REGs with a given numerology (e.g., SCS, CP length, etc.). A plurality of CORESETs for one UE may overlap in the time/frequency domain. The CORESET may be configured by system information (e.g., master information block (MIB)) or UE-specific higher layer signaling (e.g., radio resource control (RRC) layer signaling). Specifically, the numbers of RBs and OFDM symbols (up to three OFDM symbols) in the CORESET may be configured by higher layer signaling.

To receive/detect the PDCCH, the UE monitors PDCCH candidates. A PDCCH candidate refers to CCE(s) that the UE should monitor for PDCCH detection. Each PDCCH candidate is defined by 1, 2, 4, 8, or 16 CCEs depending on the AL. Here, monitoring includes (blind) decoding of PDCCH candidates. A set of PDCCH candidates monitored by the UE are defined as a PDCCH search space (SS). The SS may include a common search space (CSS) or a UE-specific search space (USS). The UE may obtain DCI by monitoring PDCCH candidates in one or more SSs, which are configured by an MIB or higher layer signaling. Each CORESET is associated with one or more SSs, and each SS is associated with one CORESET. The SS may be defined based on the following parameters.

controlResourceSetId: this indicates the CORESET related to the SS.

monitoringSlotPeriodicityAndOffset: this indicates a PDCCH monitoring periodicity (on a slot basis) and a PDCCH monitoring period offset (on a slot basis).

monitoringSymbolsWithinSlot: this indicates PDCCH monitoring symbols in a slot (e.g., first symbol(s) in the CORESET).

nrofCandidates: this denotes the number of PDCCH candidates for each AL={1, 2, 4, 8, 16} (one of 0, 1, 2, 3, 4, 5, 6, and 8).

An occasion (e.g., time/frequency resource) for monitoring PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH delivers DL data (e.g., a downlink shared channel (DL-SCH) transport block (TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

The PUCCH delivers uplink control information (UCI). The UCI includes the following information.

SR: information used to request UL-SCH resources.

HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term "HARQ-ACK is interchangeably used with HARQ ACK/NACK and ACK/NACK.

CSI: feedback information for a DL channel. Multiple input multiple output (MIMO)-related feedback information includes an RI and a PMI.

Table 5 illustrates exemplary PUCCH formats. PUCCH formats may be divided into short PUCCHs (Formats 0 and 2) and long PUCCHs (Formats 1, 3, and 4) based on PUCCH transmission durations.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |

TABLE 5-continued

| PUCCH format | Length in OFDM symbols $N_{symb}^{PUCCH}$ | Number of bits | Usage | Etc |
|---|---|---|---|---|
| 3 | 4-14 | >2 | HARQ, CSI, [SR] | DFT-s-OFDM (no UE multi-plexing) |
| 4 | 4 14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Figure 6:
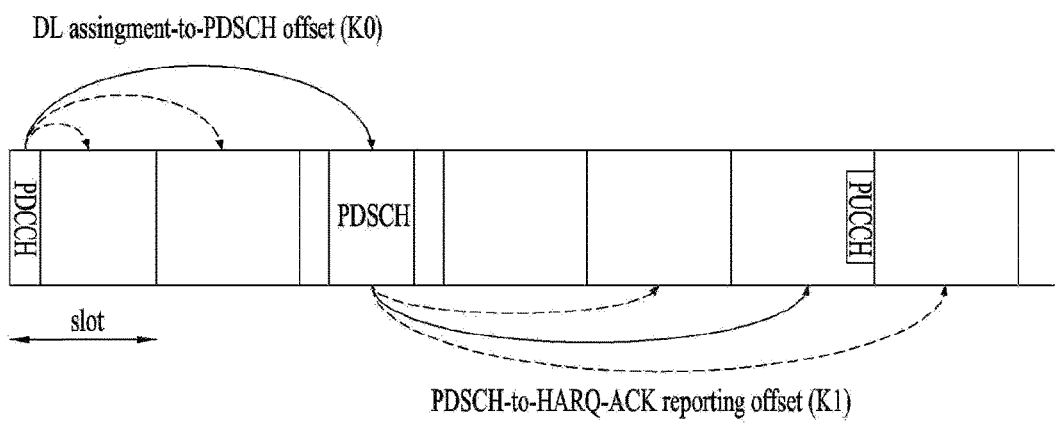
FIG. 6 illustrates an acknowledgment/negative acknowledgment (ACK/NACK) transmission process.

FIG. 6 illustrates an ACK/NACK transmission process. Referring to FIG. 6, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-HARQ-ACK reporting offset, K1. For example, DCI format 1_0 or DCI format 1_1 may include the following information.

Frequency domain resource assignment: Indicates an RB set assigned to the PDSCH.

Time domain resource assignment: Indicates K0 and the starting position (e.g. OFDM symbol index) and length (e.g. the number of OFDM symbols) of the PDSCH in a slot.

PDSCH-to-HARQ_feedback timing indicator: Indicates K1.

HARQ process number (4 bits): Indicates the HARQ process identity (ID) of data (e.g., a PDSCH or a TB).

After receiving the PDSCH in slot #(n+K0) according to the scheduling information of slot #n, the UE may transmit UCI on the PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

There are a plurality of parallel DL HARQ processes for DL transmissions in a BS/UE. In the plurality of parallel HARQ processes, DL transmissions are continuously performed, while an HARQ feedback indicating successful or failed reception of a previous DL transmission is awaited. Each DL HARQ process manages state variables related to the transmission number of MAC protocol data units (PDUs) in a buffer, an HARQ feedback for a MAC PDU in the buffer, a current redundancy version, and so on. Each HARQ process is identified by an HARQ process ID.

Figure 7:
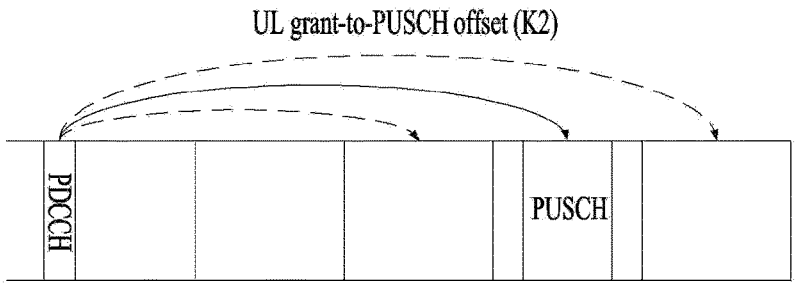
FIG. 7 illustrates a physical uplink shared channel (PUSCH) transmission process.

FIG. 7 illustrates an exemplary PUSCH transmission process. Referring to FIG. 7, a UE may detect a PDCCH in slot #n. The PDCCH may include UL scheduling information (e.g., DCI format 0_0 or DCI format 0_1). DCI format 0_0 and DCI format 0_1 may include the following information.

Frequency domain resource assignment: Indicates an RB set allocated to a PUSCH.

Time domain resource assignment: Specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit the PUSCH in slot #(n+K2) according to the scheduling information in slot #n. The PUSCH includes a UL-SCH TB.

Figure 8:
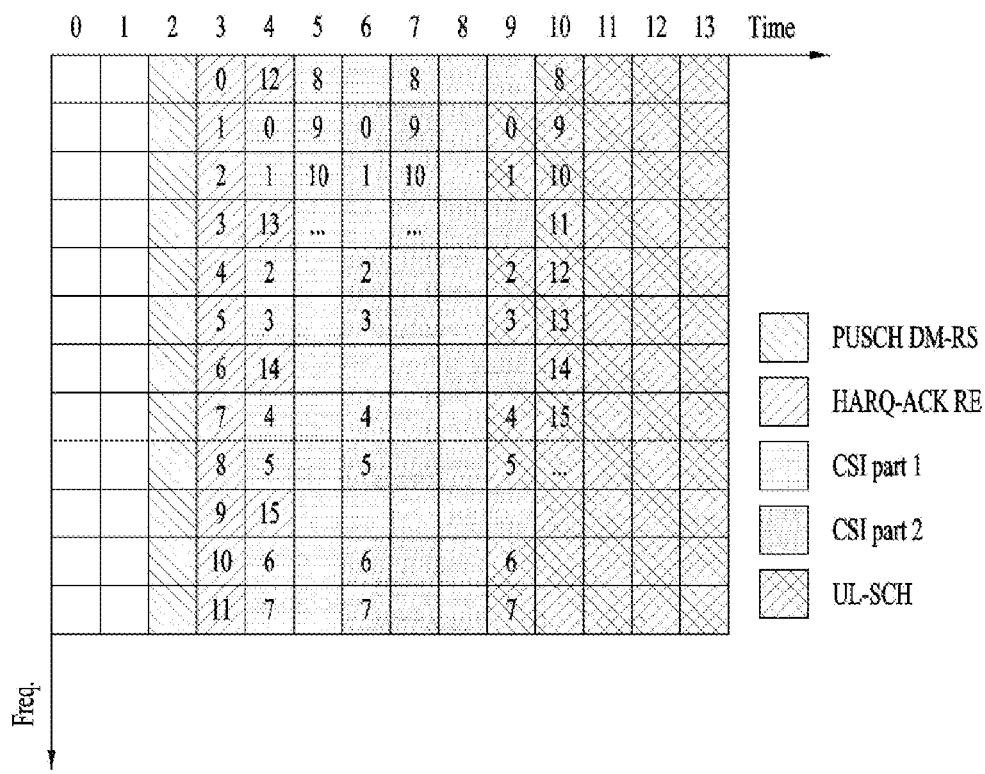
FIG. 8 illustrates exemplary multiplexing of control information in a PUSCH.

FIG. 8 illustrates exemplary multiplexing of UCI in a PUSCH. If a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 8, an HARQ-ACK and CSI are carried in a PUSCH resource.

Figure 9:
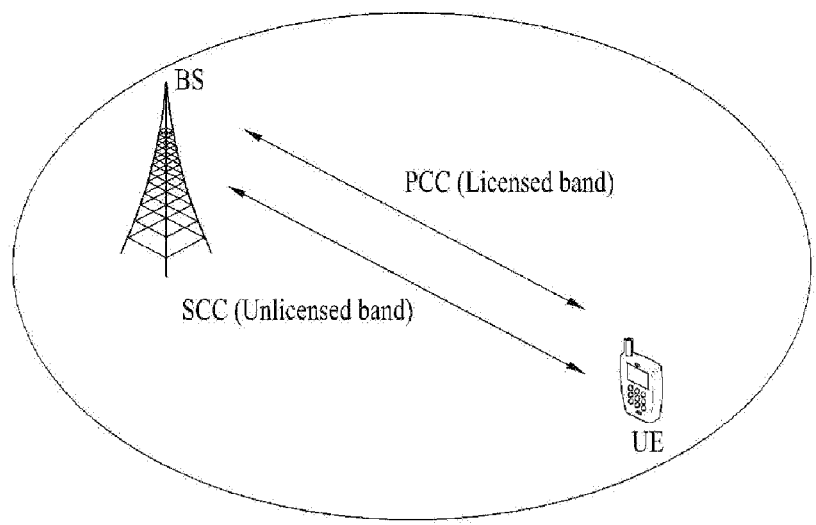
FIG. 9 illustrates a wireless communication system supporting an unlicensed band.
Figure 9:
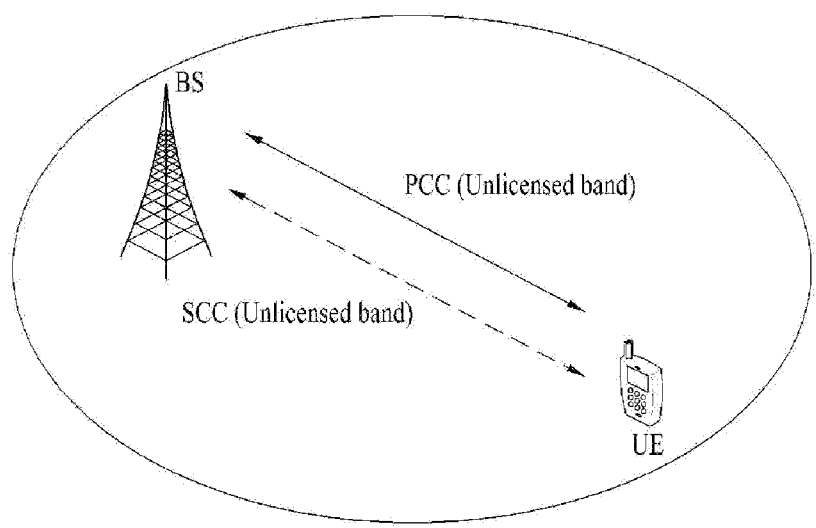

FIG. 9 illustrates an exemplary wireless communication system supporting an unlicensed band applicable to the present disclosure. In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When carrier aggregation (CA) is supported, one UE may use a plurality of aggregated cells/carriers to exchange a signal with the BS. When one UE is configured with a plurality of CCs, one CC may be set to a primary CC (PCC), and the remaining CCs may be set to secondary CCs (SCCs). Specific control information/channels (e.g., CSS PDCCH, PUCCH) may be transmitted and received only on the PCC. Data may be transmitted and received on the PCC/SCC. FIG. 9 (a) shows a case in which the UE and BS exchange signals on both the LCC and UCC (non-stand-alone (NSA) mode). In this case, the LCC and UCC may be set to the PCC and SCC, respectively. When the UE is configured with a plurality of LCCs, one specific LCC may be set to the PCC, and the remaining LCCs may be set to the SCC. FIG. 9(a) corresponds to the LAA of the 3GPP LTE system. FIG. 9(b) shows a case in which the UE and BS exchange signals on one or more UCCs with no LCC (stand-alone (SA) mode). In this case, one of the UCCs may be set to the PCC, and the remaining UCCs may be set to the SCC. Both the NSA mode and SA mode may be supported in the U-band of the 3GPP NR system.

Figure 10:
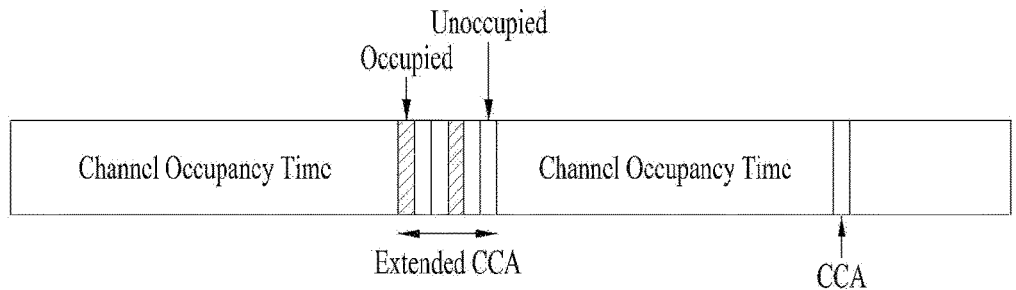
FIG. 10 illustrates an exemplary method of occupying resources in an unlicensed band.

FIG. 10 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set q∈{4, 5, ..., 32} and then perform CCA for one CCA slot. When the channel is unoccupied in the first CCA slot, the communication node may secure a time period of up to (13/32)q ms and transmit data in the time period. When the channel is occupied in the first CCA slot, the communication node randomly selects N∈{1, 2, ..., q}, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to (13/32)q ms and transmit data.

Specifically, a plurality of CAP types may be defined for UL transmission in the U-band. For example, the UE may perform a Type 1 CAP or a Type 2 CAP for UL signal transmission in the U-band. In general, the UE may perform a CAP configured/indicated by the BS (e.g., Type 1 CAP or Type 2 CAP) for the UL signal transmission.

(1) Type 1 UL CAP Method

Figure 11:
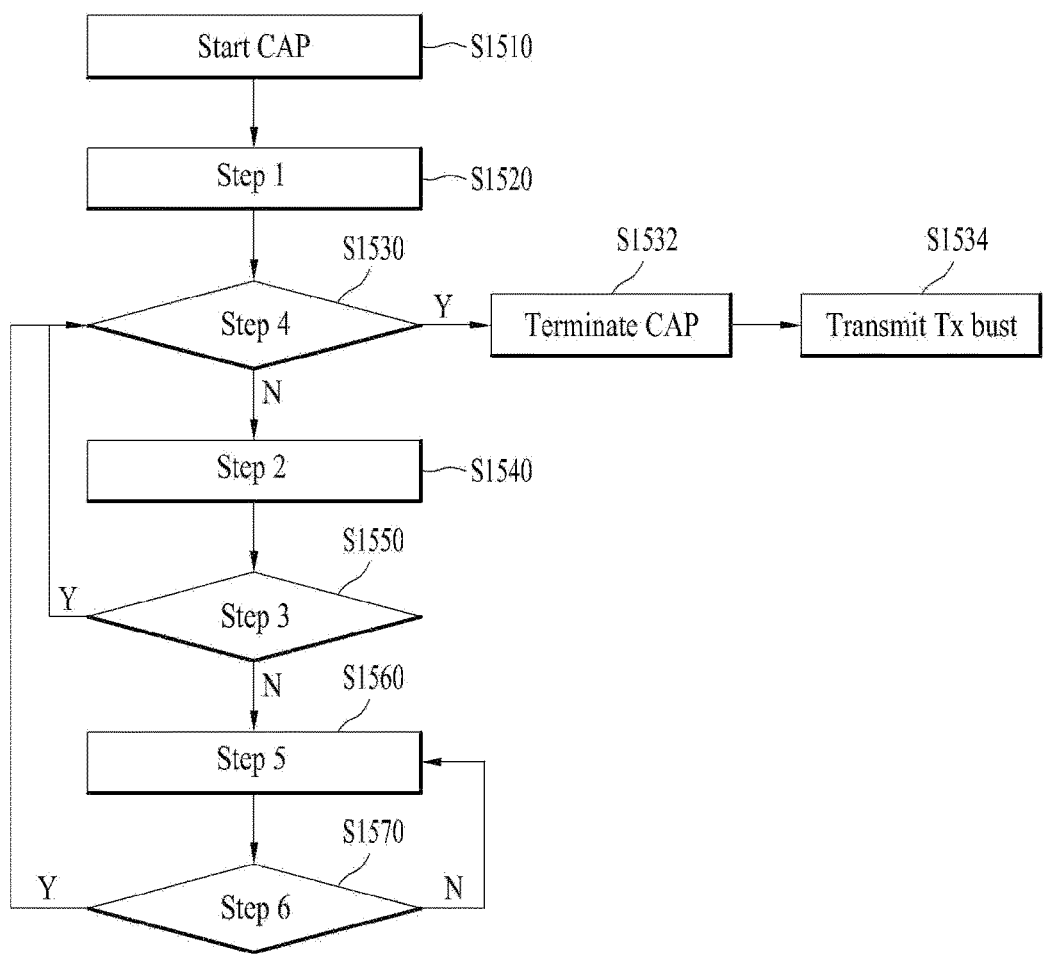
FIG. 11 is a flowchart illustrating a Type 1 channel access procedure (CAP) of a user equipment (UE) for uplink (UL) signal transmission.

FIG. 11 is a flowchart illustrating UE's Type 1 CAP operation for UL signal transmission.

To transmit a signal in the U-band, the UE may initiate a CAP (S1510). The UE may randomly select a backoff counter N within a contention window (CW) according to step 1. In this case, N is set to an initial value $N_{init}$ (S1520). $N_{init}$ may have a random value between 0 and $CW_p$. If it is determined according to step 4 that the backoff counter value (N) is 0 (YES in S1530), the UE terminates the CAP (S1532). Then, the UE may perform Tx burst transmission (S1534). If the backoff counter value is non-zero (NO in S1530), the UE decreases the backoff counter value by 1 according to step 2 (S1540). The UE checks whether the channel of U-cell(s) is idle (S1550). If the channel is idle (YES in S1550), the UE checks whether the backoff counter value is 0 (S1530). On the contrary, if the channel is not idle in S1550, that is, if the channel is busy (NO in S1550), the UE checks whether the corresponding channel is idle for a defer duration $T_d$ (longer than or equal to 25 usec), which is longer than a slot duration (e.g., 9 usec), according to step 5 (S1560). If the channel is idle for the defer duration (YES in S1570), the UE may resume the CAP. Here, the defer duration may include a duration of 16 usec and $m_p$ consecutive slot durations (e.g., 9 usec), which immediately follows the duration of 16 usec. If the channel is busy for the defer duration (NO in S1570), the UE performs step S1560 again to check whether the channel is idle for a new defer duration.

Table 6 shows that the values of $m_p$, a minimum CW, a maximum CW, a maximum channel occupancy time (MCOT), and allowed CW sizes, which are applied to the CAP, vary depending on channel access priority classes.

TABLE 6

| Channel Access Priority Class (p) | $m_p$ | $CW_{min, p}$ | $CW_{max, p}$ | $T_{N/mcot, p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The size of a CW applied to the Type 1 UL CAP may be determined in various ways. For example, the CW size may be adjusted depending on whether the value of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min, p}$ for every priority class p∈{1, 2, 3, 4}. Otherwise, the UE may increase $CW_p$ for every priority class p∈{1,2,3,4} to a next higher allowed value.

A reference subframe $n_{ref}$ (or reference slot $n_{ref}$) is determined in the following manner.

When the UE receives a UL grant in a subframe (or slot) $n_g$ and transmits a UL-SCH in subframes (or slots) $n_0$, $n_1, \ldots n_w$, starting from the subframe (or slot) no without a gap, the reference subframe (or slot) $n_{ref}$ is the subframe (or slot) no.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

Embodiment: HARQ-ACK Feedback in U-Band

To support standalone operation in a U-band, the UE may need to provide HARQ-ACK feedback for DL data (e.g., PDSCH) reception based on PUCCH/PUSCH transmission in the U-band (herein, HARQ-ACK is referred to as A/N). A PUCCH/PUSCH may mean a PUCCH or a PUSCH. For example, it may be considered that the BS schedules DL data transmission to the UE within a channel occupancy time (COT) period, which is obtained by the LBT (CCA) operation, and instructs the UE to transmit A/N feedback for DL data reception within the same COT period (herein, CCA is referred to as LBT). In another example, it may be considered that due to a UE processing time required for decoding a DL data signal and encoding an A/N signal for the DL data signal, the BS instructs the UE to transmit A/N feedback for reception of DL data, which is scheduled/transmitted within a specific COT period, in another COT period behind the corresponding COT period.

The present disclosure proposes a method of configuring/transmitting A/N feedback in a U-band. The A/N feedback configuration/transmission method may be performed in consideration of LBT operation, COT configurations, etc. The features of the present disclosure are not limited to transmission of A/N feedback over the PUCCH/PUSCH but applicable to transmission of other UCIs (e.g., CSI, SR, etc.) over the PUSCCH/PUSCH in a similar way. The features of the present disclosure are not limited to LBT-based U-band operations but applicable to L-band (or U-band) operations with no LBT in a similar way. In the following, a plurality of CCs (or CC indices) may be replaced with a plurality of BWPs (BWP indices) configured in one CC/(serving) cell (or multiple CCs/(serving) cells) or a plurality of CCs/(serving) cells including a plurality of BWPs (i.e., a combination of CCs (CC indices) and BWPs (BWP indices)).

The terms used herein are defined as follows.

UCI: The UCI refers to control information transmitted from a UE in UL. The UCI includes various types of control information (UCI types). For example, the UCI may include a HARQ-ACK, an SR, CSI, etc.

HARQ-ACK: The HARQ-ACK indicates whether DL data (e.g., a transport block (TB), a codeword (CW), etc.) on the PDSCH is successfully received. A 1-bit HARQ-ACK may be transmitted in response to one piece of DL data, and a two-bit HARQ-ACK may be transmitted in response to two pieces of DL data. HARQ-ACK responses/results may include a positive ACK (ACK), negative ACK (NACK), DTX, or NACK/DTX. Herein, HARQ-ACK is interchangeable with ACK/NACK, A/N, or AN.

HARQ process number/ID: This represents the number or ID of a HARQ process. The HARQ process manages state variables for the number of times of MAC PDU transmission in a buffer, HARQ feedback for a MAC PDU in a buffer, a current redundancy version, etc.

PUCCH: The PUCCH refers to a physical layer uplink channel for UCI transmission. In this document, PUCCH resources configured and/or indicated by the BS to transmit an A/N, an SR, and CSI are referred to as an A/N PUCCH resource, an SR PUCCH resource, and a CSI PUCCH resource, respectively.

PUSCH: The PUSCH refers to a physical layer uplink channel for UL data transmission.

Slot: The slot refers to a basic time unit (TU) (or time interval) for data scheduling. The slot includes a plurality of symbols. In this document, a symbol may be an OFDM-based symbol (e.g., CP-OFDM symbol, DFT-s-OFDM symbol, etc.). Further, a symbol is interchangeable with an OFDM-based symbol, OFDM symbol, CP-OFDM symbol, and DFT-s-OFDM symbol.

Each of the following proposed methods may be applied together with other proposed methods unless they collide with each other.

(1) Basic Operation Modes

Hereinafter, basic operation modes for A/N feedback configuration/transmission proposed in the present disclosure will be described. In the present disclosure, A/N triggering DCI may at least include DL grant DCI and further include UL grant DCI and/or specific DCI that does not schedule PDSCH/PUSCH transmission (in addition to the DL grant DCI).

Figure 12:
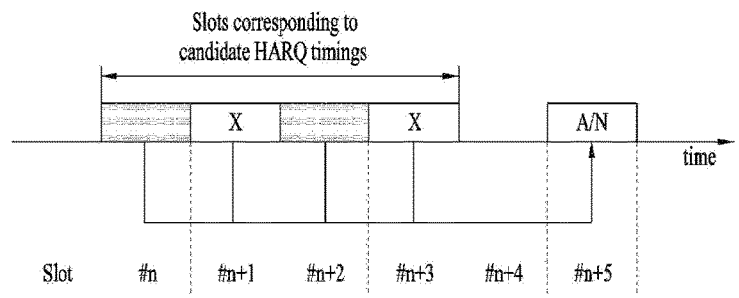
FIGS. 12 to 15 illustrate signal transmission according to examples of the present disclosure.
Figure 12:
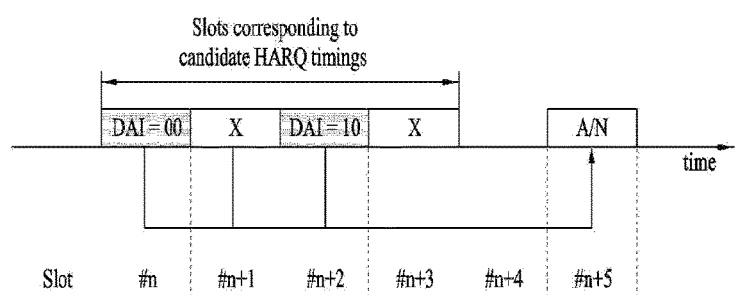

1) Timing-based A/N feedback mode (t-A/N mode) (FIG. 12)

A. After preconfiguring a plurality of candidate HARQ timings through RRC signaling, the BS may inform the UE of one of the candidate HARQ timings in (DL grant) DCI. The UE may transmit A/N feedback for reception of PDSCH(s) in a plurality of slots (or a set of slots), which are related to a set of all candidate HARQ timings, at the indicated HARQ timing (herein, a set of slots is referred to as a bundling window). Here, the HARQ timing refers to a PDSCH-to-A/N timing/interval. The HARQ timing may be expressed in a unit of slot.

For example, if it is indicated that A/N transmission is performed in slot #m, A/N information may include a response for PDSCH reception in slot #(m-i), where slot #(m-i) corresponds to a candidate HARQ timing. FIG. 12(a) shows a case in which candidate HARQ timings are configured as follows: i={2, 3, 4, 5}. If it is indicated that the A/N transmission time is slot #(n+5)(=m), the UE may generate/transmit A/N information for PDSCH reception in slots #n to #(n+3)(=m-i) (i.e., A/N feedback for all four slots). In this case, A/N responses for the PDSCH reception in slots #n+1 to #n+3 may be processed as NACK.

B. In addition to a HARQ timing indication, a counter downlink assignment index (c-DAI) and/or a total-DAI (t-DAI) may also be included in (DL grant) DCI. The counter-DAI may indicate how many PDSCHs are scheduled before a PDSCH related to the (DL grant) DCI. The total-DAI may indicate the total number of PDSCHs scheduled so far (until the current slot) (or the total number of slots including the PDSCH). In this case, the UE may transmit A/N feedback for as many PDSCHs as counter-DAI values from the initial counter-DAI value to the last (received)

total-DAI value at the indicated HARQ timing. If the UE is configured with only one serving cell, the counter-DAI may have the same meaning as the total-DAI. Thus, if there are a plurality of serving cells, the total-DAI may be included in the (DL grant) DCI. When the UE is configured with a plurality of serving cells, the counter-DAI may be first calculated in the cell domain, and then indicate the scheduling order of PDSCHs calculated in the time domain (or the order of serving cells (slots) including the PDSCH). Similarly, the total-DAI may indicate the total number of PDSCHs scheduled so far (until the current slot) (or the total number of serving cells (slots) including the PDSCH). The counter/total-DAI may be defined with respect to the PDCCH. In this case, the PDSCH may be replaced with the PDCCH, and a slot including the PDCCH may be replaced with a PDCCH monitoring occasion related to or including the PDCCH (or DCI).

To indicate the counter/total-DAI, two bits may be used. For numbers greater than 4, the counter/total-DAI may be indicated as follows based on modulo operation.

When the DAI bits are 00 (DAI value=1), 4n+1 is indicated (that is, 1, 5, 9, . . . ).
When the DAI bits are 01(DAI value=2), 4n+2 is indicated (that is, 2, 6, 10, . . . ).
When the DAI bits are 10 (DAI value=3), 4n+2 is indicated (that is, 3, 7, 11, . . . ).
When the DAI bits are 11 (DAI value=4), 4n+4 is indicated (that is, 4, 8, 12, . . . ).
where n is an integer greater than or equal to 0.

FIG. 12(b) illustrates a case in which the DAI is signaled in the (DL grant) DCI in the same state as FIG. 12(a). Referring to FIG. 12(b), a PDSCH scheduled by DCI with DAI=00 may be received in slot #n, and a PDSCH scheduled by DCI with DAI=10 may be received in slot #(n+2). In this case, the UE may generate/transmit A/N information for reception of only three PDSCHs corresponding to consecutive DAI values (i.e., DAI=00/01/11) (hereinafter, such consecutive DAI values are referred to as a DAI sequence). The A/N response for reception of a PDSCH corresponding to DAI=01 may be processed as NACK.

Figure 13:
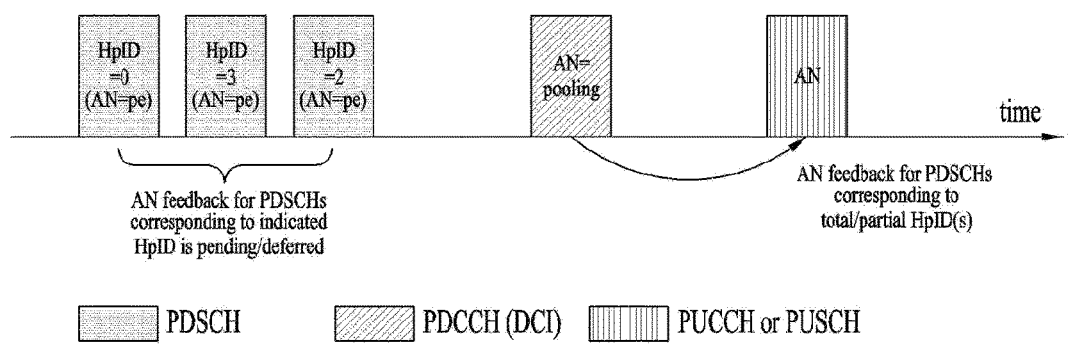

2) Pooling-based A/N feedback mode (p-A/N mode) (FIG. 13)

A. The BS may instruct the UE to defer A/N feedback transmission for PDSCHs in DL grant DCI. Then, the BS may instruct the UE to transmit A/N feedback for PDSCHs related to (i) all DL HARQ process IDs or (2) some specific DL HARQ process ID(s) in DCI (pooling). The A/N feedback may be transmitted at a timing configured/indicated by a specific signal (e.g., RRC or DCI signaling). A/N pooling may be indicated by a DL grant (e.g., DCI format 1_0/1_1), a UL grant (e.g., DCI format 0_0/0_1), or other DCIs (e.g., UE (or UE-group) common DCI). For convenience of description, DCI indicating A/N pooling is referred to as pooling DCI. HARQ process ID(s) to be pooled may be configured/defined in advance or indicated by the pooling DCI. The A/N pooling may be indicated for each HARQ process ID, for a group of HARQ process IDs, or for all HARQ process IDs.

For example, referring to FIG. 13, the UE may receive three PDSCHs from the BS. The HARQ process IDs (HpIDs) allocated to the PDSCHs may be 0, 3, and 2. A/N pending for the three PDSCHs may be indicated by the DL grant DCI (AN=pending). In this case, the UE defers A/N transmission for PDSCH reception corresponding to HpID=0/3/2. Thereafter, upon receiving the pooling DCI (AN=pooling) from the BS, the UE may transmit A/N for PDSCH reception corresponding to all or some HPIDs at a time.

B. When counter/total-DAI signaling is configured in the t-A/N mode (e.g., when a DAI is signaled in DL grant DCI), the A/N pooling may be defined as follow: A/N transmission for PDSCH(s) related to HARQ process ID(s) (indicated by the pooling DCI) is pooled or A/N transmission for PDSCH(s) related to a total-DAI value (indicated by the pooling DCI) is pooled. In the latter case, the UE may transmit A/N information for reception of as many PDSCHs as the value from the initial counter-DAI value to the total-DAI value at a time.

(2) Proposed Method 1

According to proposed method 1, the A/N triggering DCI may include 1) timing-A indicating an actual A/N transmission timing and 2) a reference A/N timing for a group of (DL PDSCH) slots for which A/N feedback is required.

Based on that, the UE may transmit A/N feedback for a related slot group (A/N feedback for PDSCH reception in the slot group) at the time indicated by timing-A. In this case, A/N payloads may be mapped (ordered) in the order of slot indices in the corresponding slot group.

For example, the A/N triggering DCI may be transmitted/detected in/from slot #n (if the A/N triggering DCI is the DL grant DCI, a related PDSCH may be transmitted/detected in/from slot #n). In addition, the corresponding DCI may indicate that timing-A=K and L. In this case, the UE may transmit A/N feedback for a slot group corresponding to slot #(n+K−L) (A/N feedback for PDSCH reception in the slot group) in slot #(n+K). A slot group may be defined as a timing set consisting of multiple (e.g., M) candidate timing values, D_m (m=0, 1, . . . , M−1). For example, a slot group corresponding to slot #n may be set/defined as M slots corresponding to slot #(n−D_m) or slot #(n+D_m) (m=0, 1, . . . , M−1). In this case, the slot group corresponding to slot #(n+K−L) may be set/defined as slot #(n+K−L−D_m) or slot #(n+K−L+D_m) (m=0, 1, . . . , M−1).

A timing set that defines a slot group may be equal to or different from a set of candidate timing-A values (e.g., K_m; m=0, 1, . . . , M−1), which may be indicated by timing-A. For example, a bundling window corresponding to slot #n includes slot #(n−K_m), and the slot group corresponding to slot #n may be defined by a timing set consisting of K_m values (m=0, 1, . . . , M−1). For example, the A/N triggering DCI may be transmitted/detected in/from slot #n (if the A/N triggering DCI is the DL grant DCI, the related PDSCH may be transmitted/detected in/from slot #n). In addition, the corresponding DCI may indicate that timing-A=K and L. In this case, the UE may transmit A/N feedback for the slot group corresponding to slot #(n+K−L) (A/N feedback for PDSCH reception in the slot group) in slot #(n+K). The slot group corresponding to slot #(n+K−L) may be include slot #(n+K−(K_m+L)) (m=0, 1, . . . , M−1).

When the A/N triggering DCI is equal to the DL grant DCI (that is, when both timing-A and timing-D are signaled in the DL grant DCI), the UE may combine and transmit 1) A/N feedback for a bundling window related to timing-A (A/N feedback for PDSCH reception therein) and 2) A/N feedback for a slot group related to timing-D (A/N feedback for PDSCH reception therein) at the time indicated by timing-A (for example, the UE may simultaneously transmit the A/N feedback for the bundling window and the A/N feedback for the slot group over one PUCCH/PUSCH).

For example, when the DL grant DCI or related PDSCH is transmitted/detected in/from slot #n and when the corresponding DCI indicates timing-A=K and timing-D=L, the UE may combine 1) A/N feedback for a bundling window corresponding to slot #(n+k) (A/N feedback for PDSCH reception therein) and 2) A/N feedback for a slot group corresponding to slot #(n+K−L) (A/N feedback for PDSCH reception therein) and then transmit the combined A/N feedback in slot #(n+K). The slot group corresponding to slot #(n+K−L) may be set/defined as (i) slot #(n+K−L−D_m) or slot #(n+K−L+D_m) (m=0, 1, . . . , M−1) and/or (ii) slot #(n+K−(K_m+L)) (m=0, 1, . . . , M−1).

Additionally, it may be indicated by DCI that there is no timing-D and/or no slot group related to timing-D (i.e., no A/N feedback request therefor) (for example, when the A/N triggering DCI is equal to the DL grant DCI). For example, when timing-D is set to a specific value (e.g., 0), it may be indicated that there is no slot group relate to timing-D (i.e., no A/N feedback request therefor).

Additionally, it may be indicated by DCI (for example, by a timing-D indication field) that A/N feedback is required only for specific slots (e.g., first or last slot) among slots included in the bundling window related to timing-A (or the slot group related to timing-D) (for example, when the A/N triggering DCI is equal to the DL grant DCI).

As another method, it may be also considered that timing-A/timing-D and/or A/N feedback transmission triggering for the slot group (or bundling window) related to timing-A/timing-D are signaled by UE (or UE-group) common DCI.

The reference A/N timing indicated by timing-D (a slot group for which A/N feedback is required) may be restricted due to limitations on the size (the number of bits) of a DCI field. In consideration of the restriction, it may be indicated by a specific state of the timing-D indication field that A/N feedback is required for reception of PDSCHs related to all HARQ process IDs or some (predetermined) specific HARQ process IDs (rather than a specific slot group).

A different A/N transmission PUCCH/PUSCH resource (set) may be configured for each value of timing-D. For example, a different A/N transmission PUCCH/PUSCH resource (set) may be configured for each slot group related to each timing-D value. Alternatively, the value of timing-D (related to a slot group for which A/N feedback is required on a corresponding PUCCH/PUSCH resource (set)) may vary for each A/N transmission PUCCH/PUSCH resource (set).

(3) Proposed Method 2

According to proposed method 2, when the size of one slot group is predetermined (for example, when the number of slots in one slot group N or the maximum number of PDSCHs scheduled in one slot group N is predetermined), 1) a current-ID (c-ID) indicating the ID of a slot group including a slot in which DL grant DCI or a PDSCH corresponding the DL grant DCI is transmitted may be signaled by the corresponding DCI, and/or 2) a feedback-ID (f-ID) indicating the ID of a (DL PDSCH) slot group for which A/N feedback is required may be signaled by A/N triggering DCI.

In this case, the UE may transmit A/N feedback for a slot group related to the feedback-ID (A/N feedback for PDSCH reception therein) at an indicated A/N transmission timing (e.g., a slot). The slot group related to the feedback-ID may include a slot in which a current-ID having the same value as the f-I D has been signaled/received, that is, a slot in which the current-ID having the same value as the feedback-ID has been signaled/received in the DL grant DCI.

In this case, A/N payloads may be mapped (ordered) in the order of counter-DAI values (e.g., from 1 to N) received in the DL grant DCI for the slot group related to the feedback-ID (when the counter-DAI is signaled in the DL grant DCI).

Figure 14:
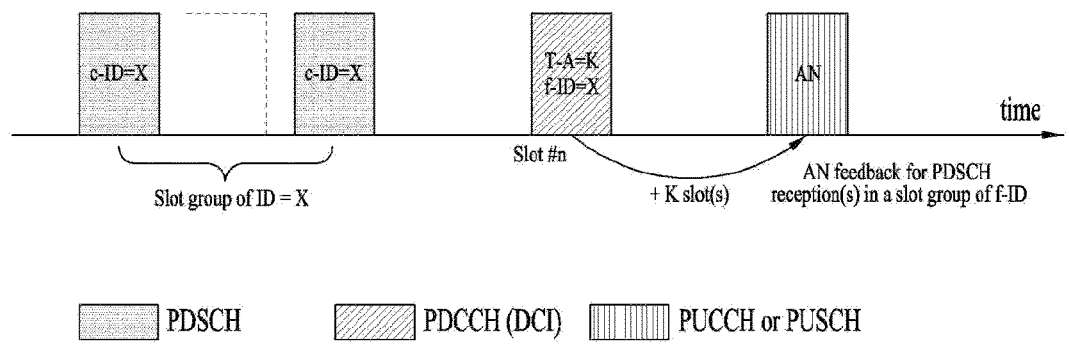

For example, referring to FIG. 14, the A/N triggering DCI may be transmitted/detected in/from slot #n (if the A/N triggering DCI is the DL grant DCI, a related PDSCH may be transmitted/detected in/from slot #n). In addition, the corresponding DCI may indicate that timing-A (T-A)=K and feedback-ID (f-ID)=X. In this case, the UE may transmit A/N feedback for PDSCH reception in a slot group corresponding to slot group ID=X (where the DL grant DCI indicates current-ID=X) in slot #(n+K).

As shown in FIG. 12(b), it may be determined/signaled that the counter-DAI has consecutive values (starting from the initial value (e.g., 1)) in one slot group (ID). The counter-DAI value may be determined/signaled independently for different slot groups. In addition, a slot group may be defined in the form of a DAI sequence consisting of counter-DAI values from 1 to N, which are related to the same slot group ID value (indicated by DCI). In this case, the slot group may include non-consecutive slots based on the received/detected counter-DAI. In this document, a slot group ID may be replaced/substituted with a DAI sequence ID.

When the A/N triggering DCI is equal to the DL grant DCI (that is, when both the current-ID and feedback-ID are signaled in the DL grant DCI), the UE may combine (concatenate) and transmit 1) A/N feedback for a bundling window related to timing-A or a slot group related to the current-ID (A/N feedback for PDSCH reception therein) and 2) A/N feedback for a slot group related to the feedback-ID (A/N feedback for PDSCH reception therein) at the time indicated by timing-A (at the same time, for example over one PUCCH/PUSCH).

When it is said in this document that the feedback-ID is signaled by the A/N triggering DCI (e.g., DL grant DCI, UL grant DCI, etc.), it may mean that the corresponding DCI includes a total-ID indicating the total number of (PDSCH) slot groups (IDs) for which A/N feedback is required and a specific slot group ID determined by the total-ID and current-ID is applied as the feedback-ID. For example, when a maximum of two (PDSCH) slot group IDs (e.g., ID=0 or ID=1) are configured, if it is indicated that current-ID=X and total-ID=1, the feedback-ID may be determined/applied as X (which is the same as the current-ID). In another example, when a maximum of two (PDSCH) slot group IDs (e.g., ID=0 or ID=1) are configured, if it is indicated that current-ID=X and total-ID=2, the feedback-ID may be determined/applied as Y (which is different from the current-ID). X and Y may be different from each other (for example, Y=1 if X=0, or Y=0 if X=1). The method of determining a feedback-ID is referred to as "Method 1" for convenience.

For example, the DL grant DCI or related PDSCH may be transmitted/detected in/from slot #n, and the corresponding DCI may indicate timing-A=K, current-ID=X, and feedback-ID=Y (or total-ID=2). In this case, the UE may combine 1) A/N feedback for a bundling window corresponding to slot #(n+k) or a slot group corresponding to ID=X (A/N feedback for PDSCH reception therein) and 2) A/N feedback for a slot group corresponding to ID=Y (A/N feedback for PDSCH reception therein) and then transmit the combined A/N feedback in slot #(n+K).

In this document, a total-DAI and/or new feedback indicator (NFI) for the feedback-ID (or a (PDSCH) slot group related thereto) signaled/indicated by the A/N triggering DCI (e.g., DL grant DCI, UL grant DCI, etc.) may mean a total-DAI and/or NFI for a feedback-ID determined according to Method 1 or a total-DAI and/or NFI for an other-ID (or a slot group related thereto) which is different from the current-ID (regardless of the value indicated by the total-ID). As an example for the latter, when a maximum of two (PDSCH) slot group IDs (e.g., ID=0 or ID=1) are configured, if it is indicated that current-ID=X, the total-DAI and/or NFI for the feedback-ID may mean a total-DAI and/or NFI for a slot group related to other-ID=Y. X and Y may be different from each other (for example, Y=1 if X=0, or Y=0 if X=1). The method of determining an other-ID and applying a total-DAI/NFI is referred to as "Method 2" for convenience.

The NFI may be 1-bit information and indicate whether the BS (a) successfully receives/detects previously (or recently) transmitted A/N feedback (such A/N feedback is referred as previous A/N feedback) or (b) fails in the reception/detection. In the case of (a), the UE may configure/transmit updated A/N feedback by processing a remaining part except A/N for PDSCH(s) scheduled after the previous A/N transmission as NACK or DTX (or by dropping the feedback configuration/transmission). In the case of (b), the UE may configure/transmit A/N feedback by maintaining the remaining part except the A/N for the PDSCH(s) scheduled after the previous A/N transmission. In the case of (a), an NFI value toggled from an NFI value received in previous DCI may be indicated by current DCI. In the case of (b), an NFI value non-toggled from the NFI value received by the previous DCI may be indicated by the current DCI.

Additionally, it may be indicated by DCI (for example, by a feedback-ID (or total-ID) indication field) that there is no feedback-ID (or no other-ID) and/or no slot group related thereto (i.e., no A/N feedback request therefor) (for example, when the A/N triggering DCI is equal to the DL grant DCI). For example, when it is indicated that the feedback-ID is equal to the current-ID (or when the total-ID is 1), the UE may configure/transmit A/N feedback for slot group(s) related to the current-ID.

Additionally, it may be indicated by DCI (for example, by the feedback-ID (or total-ID) indication field) that A/N feedback is required only for specific slots (e.g., first or last slot) among slots included in the bundling window related to timing-A or slot group related to the current-ID (or slot group related to the feedback-ID (or other-ID)) (for example, when the A/N triggering DCI is equal to the DL grant DCI).

As another method, it may be also considered that the current-ID is signaled by UE (or UE-group) common DCI #1 and/or the feedback-ID and A/N feedback transmission triggering for the slot group related to the feedback-ID is signaled by UE (or UE-group) common DCI #2. In this case, UE (or UE-group) common DCI #1and UE (or UE-group) common DCI #2 may be different from each other or integrated as one DCI.

As another method, when the total-DAI is signaled by the A/N triggering DCI, the UE may configure/transmit A/N feedback only for the value(s) of the counter-DAI (from 1) to the value of the total-DAI for the slot group related to the feedback-ID (the bundling window related to timing-A or the slot group related to the current-ID). That is, the UE may configure/transmit A/N feedback only for slot(s) related to the counter-DAI value(s) from 1 to the total-DAI value (or PDSCHs scheduled thereby). Alternatively, the total-DAI may be separately signaled by DCI for each of the following: the slot group related to the feedback-ID (or other-ID) and the slot group related to the current-ID (or bundling window related to timing-A). In this case, the UE may configure A/N feedback based on the total-DAI for each slot group.

For example, information about an A/N feedback configuration, which is indicated by the DL grant DCI, may at least include (i) the current-ID, (ii) the counter/total-DAI for the slot group (or PDSCHs scheduled in the slot group) related to the current-ID, and (iii) the feedback-ID (or total-ID). The total-DAI for the slot group (or PDSCHs scheduled in the slot group) related to the feedback-ID (or other-ID) may be further included in the DL grant DCI (i.e., A/N feedback configuration related information).

The UL grant DCI may indicate (i) the current-ID, (ii) the total-DAI for the slot group (or PDSCHs scheduled in the slot group) related to the current-ID, (iii) the feedback-ID (or total-ID), and (iv) the total-DAI for the slot group related to the feedback-ID (or other-ID). In this case, the current-ID and feedback-ID may be defined/generalized as two feedback-IDs: feedback-IDs #1 and #2. Accordingly, the UE may transmit A/N feedback for slot groups related to feedback-IDs #1 and #2 over the PUSCH (or PUCCH) (for example, in the form of UCI piggyback).

As another method, the UL grant DCI may not include the current-ID (and/or feedback-ID (or total-ID)). That is, signaling of the current-ID (and/or feedback-ID (or total-ID)) in the UL grant DCI may be dropped. In this case, the UE may configure/transmit A/N feedback (on the PUSCH) based on information about the current-ID (and/or feedback-ID (or total-ID)) received by the DL grant DCI. Additionally, it may be indicated by a specific field in the UL grant DCI that there is no A/N feedback transmission request (e.g., there is no slot group for which A/N feedback is required). The specific field may include the feedback-ID (or total-ID) indication field and/or a current-ID (and/or feedback-ID (or other-ID) and/or total-DAI related to current-ID) indication field.

As another method, the current-ID and a starting-ID may be indicated by the A/N triggering DCI (e.g., DL grant DCI, UL grant DCI, etc.). In this case, the UE may be configure/transmit A/N feedback for slot group set A related to (a plurality of) consecutive slot group ID(s) from the starting-ID to the current-ID (A/N feedback for PDSCH reception therein). When it is indicated that the starting-ID is equal to the current-ID, the UE may configure/transmit A/N feedback for only slot group(s) related to the current-ID. The current-ID may be defined/generalized as an ending-ID.

For example, the A/N feedback configuration related information indicated by the DL grant DCI may at least include (i) the current-ID, (ii) the counter/total-DAI for the slot group (or PDSCHs scheduled in the slot group) related to the current-ID, and (iii) the starting-ID. The DL grant DCI (i.e., A/N feedback configuration related information) may further include total-DAI(s) commonly applied to each of (a plurality of) slot group(s) included in slot group set A (except the slot group related to the current-ID).

In another example, the UL grant DCI may indicate (i) the current-ID, (ii) the total-DAI for the slot group related to the current-ID (PDSCHs scheduled thereby), (iii) the starting-ID, and (iv) the total-DAI(s) commonly applied to each of (the plurality of) the slot group(s) included in slot group set A (except the slot group related to the current-ID). Accordingly, the UE may transmit A/N feedback for a slot group set from the starting-ID to the current-ID over the PUSCH (or PUCCH) (in the form of UCI piggyback).

In another example, the UL grant DCI may not include the current-ID (and/or starting-ID). That is, signaling of the current-ID (and/or starting-ID) in the UL grant DCI may be dropped. In this case, the UE may configure/transmit A/N feedback (on the PUSCH) based on information about the current-ID (and/or starting-ID) received by the DL grant DCI. Additionally, it may be indicated by a specific field in the UL grant DCI that there is no A/N feedback transmission request (e.g., there is no slot group for which A/N feedback is required). The specific field may include a starting-ID indication field and/or a current-ID (and/or related total-DAI) indication field.

When the above-described method or other different methods are applied, the number of slot groups for which (one-shot) simultaneous A/N feedback is required may be dynamically changed (for example, there may be two, three, or more slot groups including the current-ID). In this case, the A/N triggering DCI (e.g., DL grant DCI) and/or UL grant DCI may indicate total-DAI(s) commonly applied to a plurality of slot groups for which A/N feedback is required (except the slot group related to the current-ID).

Slot group IDs indicated by the current-ID/feedback-ID (or total-ID) (slot groups for which A/N feedback is required) may be restricted due to limitations on the size (the number of bits) of a DCI field. In consideration of the restriction, it may be indicated by a specific state of a current-ID/feedback-ID (or total-ID) indication field that A/N feedback is required for reception of PDSCHs related to all HARQ process IDs or some (predetermined) specific HARQ process IDs (rather than a specific slot group).

A different A/N transmission PUCCH/PUSCH resource (set) may be configured for each slot group ID value (or for each slot group related to the ID). Alternatively, the slot group ID value (for which A/N feedback is required on a corresponding PUCCH/PUSCH resource (set)) may vary for each A/N transmission PUCCH/PUSCH resource (set). For example, the UE may transmit A/N feedback for slot group ID=X by selecting/using a PUCCH/PUSCH resource (set) configured for slot group ID=X.

Additionally, when a plurality of carriers are aggregated/configured for one UE (i.e., in the CA environment), the same slot group ID may be commonly indicated/defined for all the plurality of carriers at the same timing (slot timing) or within the same time period (Opt 1-1), or a slot group ID may be indicated/defined for each of the plurality of carriers in a frequency-first and time-second manner (in a carrier-first and slot-group-second manner) (Opt 1-2).

Additionally, when slot group IDs are indicated/defined in the CA environment, the counter-DAI may be determined/indicated as follows: 1) a PDSCH scheduling counter value may be determined/indicated within one slot group (ID) in a frequency-first (carrier-first) and time-second (slot-second) manner (when Opt 1-1 is applied); or 2) a PDSCH scheduling counter value may be determined/indicated independently for each carrier within one slot group (ID) (when Opt 1-2 is applied).

Figure 15:
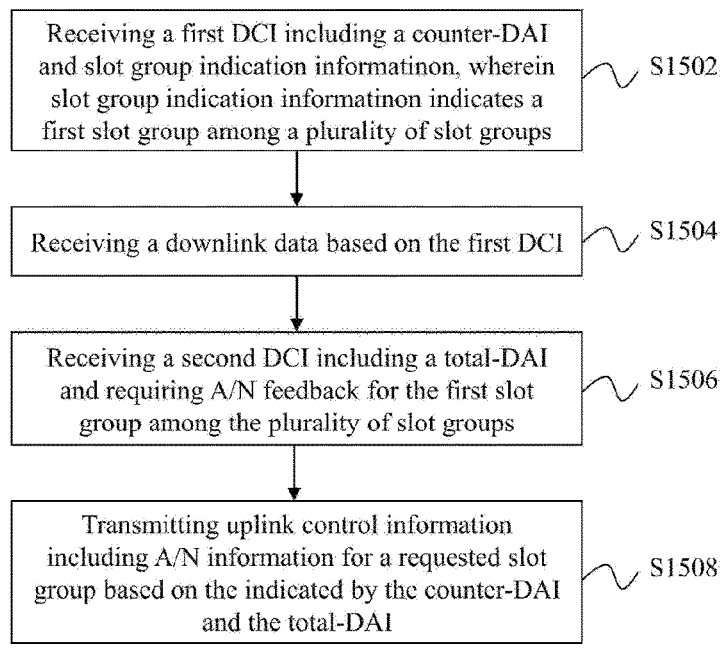

FIG. 15 illustrates an A/N transmission process according to an example of the present disclosure. Referring to FIG. 15, a UE may receive first DCI including a counter-DAI and slot group indication information (S1502). The counter-DAI may indicate a scheduling order in a slot group, and the slot group indication information may indicate a first slot group among a plurality of slot groups. The UE may receive DL data based on the first DCI (S1504). Thereafter, the UE may receive second DCI including a total-DAI and requesting A/N feedback for the first slot group among the plurality of slot groups (S1506). The total-DAI indicates the total number of times that scheduling is performed in a slot group. The UE may transmit UCI including A/N information for the first slot group based on the counter-DAI and the total-DAI (S1508). The size of the A/N information for the first slot group may be determined based on the total-DAI, and A/N information may be arranged in the order of values of the counter-DAI in the A/N information for the first slot group. The UCI may be transmitted in a U-band (e.g., UCell).

The second DCI may include DCI may include DCI scheduling a PDSCH, and the second DCI may include first information about the index of a slot group including the PDSCH and second information indicating that the first slot group is a slot group for which A/N feedback is required. The slot group indicated by the first information may be different from the first slot group. The second DCI may further include a total-DAI for the slot group including the PDSCH.

(4) Proposals

Before describing the proposed methods, the A/N feedback configuration/transmission and basic operation modes therefor will be described in brief. The t-A/N and p-A/N modes are substantially the same as those described above with reference to FIGS. 12 and 13, but the modes are summarized again to classify A/N feedback configuration/transmission modes (or A/N codebook modes).

1) Timing-Based A/N Feedback Mode (t-A/N Mode)

A. After configuring a plurality of candidate HARQ timings through RRC signaling, the BS may inform the UE of one of the candidate HARQ timings in (DL grant) DCI. The UE may transmit A/N feedback for reception of PDSCH(s) in a plurality of slots (or a set of slots), which are related to a set of all candidate HARQ timings, at the indicated HARQ timing (herein, a set of slots is referred to as a bundling window). Here, the HARQ timing refers to a PDSCH-to-A/N timing/interval. The HARQ timing may be expressed in a unit of slot. The above-described mode is referred to as a Type-1 A/N codebook.

B. In addition to a HARQ timing indication, a counter-DAI and/or a total-DAI may also be included in (DL grant) DCI. The counter-DAI may indicate how many PDSCHs are scheduled before a PDSCH related to the (DL grant) DCI. The total-DAI may indicate the total number of PDSCHs scheduled so far (until the current slot) (or the total number of slots including the PDSCH). In this case, the UE may transmit A/N for as many PDSCHs as counter-DAI values from the initial counter-DAI value to the last (received) total-DAI value at the indicated HARQ timing. The above-described mode is referred to as a Type-2 A/N codebook.

C. A/N feedback mode based on PDSCH (slot) group IDs (Type-2a A/N codebook)

i. A current-ID may be signaled in DL grant DCI, and a feedback-ID may be signaled in A/N triggering DCI. The current-ID is used to indicate the ID of a slot group including a slot in which the DL grant DCI or a PDSCH related thereto is transmitted. The feedback-ID is used to indicate the ID of a (DL PDSCH) slot group for which A/N feedback is required. In this case, a total-ID may be signaled by the DCI, and the feedback-ID may be obtained from the total-ID according to Method 1.

ii. The UE may transmit A/N feedback for a slot group related to the feedback-ID (A/N feedback for PDSCH reception therein) at an indicated A/N transmission timing.

iii. When the A/N triggering DCI is equal to the DL grant DCI (that is, when both the current-ID and feedback-ID (or total-ID) are signaled in the DL grant DCI), the UE may combine and transmit 1) A/N feedback for a bundling window related to timing-A or a slot group related to the current-ID (A/N feedback for PDSCH reception therein) and 2) A/N feedback for the slot group related to the feedback-ID (A/N feedback for PDSCH reception therein) at the time indicated by timing-A (at the same time, for example over one PUCCH/PUSCH).

2) Pooling-Based A/N Feedback Mode (p-A/N Mode)

A. The BS may instruct the UE to defer A/N feedback transmission for PDSCHs in DL grant DCI. Then, the BS may instruct the UE to transmit A/N feedback for PDSCHs related to (i) all DL HARQ process IDs or (ii) some specific DL HARQ process ID(s) in DCI (pooling). The A/N feedback may be transmitted at a timing configured/indicated by a specific signal (e.g., RRC or DCI signaling). The above-described mode is referred to as a Type-3 A/N codebook.

B. When counter/total-DAI signaling is configured in the t-A/N mode (e.g., when a DAI is signaled in DL grant DCI), the A/N pooling may be defined as follow: A/N transmission for PDSCH(s) related to HARQ process ID(s) (indicated by pooling DCI) is pooled or A/N transmission for PDSCH(s) related to a total-DAI value (indicated by the pooling DCI) is pooled. In the latter case, the UE may transmit A/N information for reception of as many PDSCHs as the value from the initial counter-DAI value to the total-DAI value at a time.

3) Dynamic Switching Between the t-A/N and p-A/N Modes

A. For example, DL grant DCI may indicate switching between the t-A/N and p-A/N modes. That is, the DL grant DCI may indicate which one of the t-A/N and p-A/N modes is used to configure/transmit A/N feedback. Additionally, both A/N pending and A/N pooling for the p-A/N mode may also be indicated by the same DL grant DCI. For example, when DL grant DCI indicates the p-A/N mode, the corresponding DL grant DCI may further indicate whether A/N feedback is pending or pooled.

B. In another example, DL grant DCI may indicate switching between A/N pending operations to apply the t-A/N or p-A/N mode. That is, the DL grant DCI may indicate whether to apply the t-A/N mode or to defer A/N feedback transmission for the p-A/N mode. In this case, the A/N pooling operation for the p-A/N mode may be indicated in UL grant DCI or (UE or UE-group) common DCI.

C. As a further example, DL grant DCI including PDSCH scheduling may indicate switching between the t-A/N mode and A/N pending for p-A/N. That is, the DL grant DCI may indicate whether to apply the t-A/N mode or defer A/N transmission for the p-A/N mode. In this case, A/N pooling for the p-A/N mode may be indicated by DL grant DCI including no PDSCH scheduling.

4) NFI Information Signaling

A. To prevent inconsistency between the A/N codebook (payload) configurations of the UE and BS, which results from when the UE drops A/N feedback transmission due to LBT failure and/or when the BS fails to detect A/N feedback (and update a contention window size (CWS) for LBT operation required for UL transmission including an A/N PUCCH, a PUSCH, etc.), a 1-bit NFI may be signaled in DCI triggering A/N feedback transmission (e.g., DL grant DCI or UL grant DCI). The NFI may be toggled to indicate the following information.

i. The NFI may indicate whether the BS (a) successfully receives/detects previously (or recently) transmitted A/N feedback (such A/N feedback is referred as previous A/N feedback) or (b) fails in the reception/detection. In the case of (a), the UE may configure/transmit updated A/N feedback by processing a remaining part except A/N for PDSCH(s) scheduled after the previous A/N transmission as NACK or DTX (or by dropping the feedback configuration/transmission). In the case of (b), the UE may configure/transmit A/N feedback by maintaining the remaining part except the A/N for the PDSCH(s) scheduled after the previous A/N transmission.

ii. In the case of (a), an NFI value toggled from an NFI value received in previous DCI may be indicated by current DCI. In the case of (b), an NFI value non-toggled from the NFI value received by the previous DCI may be indicated by the current DCI. Upon receiving the toggled NFI, the UE may reset the CWS for A/N PUCCH (and/or PUSCH) transmission to the minimum. On the contrary, upon receiving the non-toggled NFI, the UE may increase the CWS (by a predetermined amount).

Hereinafter, a description will be given of a method of configuring DL/UL grant DCI and signaling information when the Type-2a and Type-1 A/N codebooks are configured. In this document, DCI (format) where DCI format fields and field sizes are configurable (variable) is referred to as non-fallback DCI, and DCI (format) where DCI format fields and field sizes are non-configurable (fixed) is referred to as non-fallback DCI. Herein, DCI may mean non-fallback DCI unless specified as fallback DCI.

(a) DCI Configuration and Signaling Information in Configuration of Type-2a A/N Codebook 1) Information Signaled in DL Grant DCI A. Basically, the following information may be included (basic information).

i. Information about a current-ID ii. Information about a counter-DAI and a total-DAI for a (PDSCH) slot group related to the current-ID iii. Information about a feedback-ID 1. Alternatively, a total-ID may be signaled by DCI, and the feedback-ID information may be determined according to Method 1.

iv. Information about an NFI related to A/N feedback for the current ID (i.e., NFI for current-ID)

v. Information about an NFI related to A/N feedback for the feedback-ID (i.e., NFI for feedback ID)

1. Information about an NFI related to A/N feedback for an other-ID having a different value from the current-ID (regardless of the value indicated by the total-ID) (i.e., NFI for other-ID) may be used according to Method 2.

B. Additionally, the following information may be further included.

i. Information about a total-DAI for a (PDSCH) slot group related to the feedback-ID 1. Information about a total-DAI related to A/N feedback for the other-ID having a different value from the current-ID (regardless of the value indicated by the total-ID) (i.e., total-DAI for other-ID) may be used according to Method 2.

C. Additionally, the following information may be further included.

i. Information on whether A/N feedback is configured/transmitted based on the Type-3 codebook (e.g., a codebook type indicator (CTI) indicating which one of the Type-2a and Type-3 A/N codebooks is used)

ii. Notes
1. If Type-3 is indicated by DCI (at a specific time), information about an NFI related to A/N feedback based on the Type-3 codebook (i.e., NFI for Type-3) may be additionally signaled by the corresponding DCI.
2. The CTI information may be explicitly signaled by one dedicated bit or implicitly signaled as follows.
3. In a first method, when it is indicated by the DCI that A/N feedback transmission is required only for one (PDSCH) slot group related to the current-ID, the CTI information may be signaled by an NFI for feedback-ID (or NFI for other-ID) bit/field. When the CTI indicates Type-3, a HARQ process ID group and/or a cc/cell group (in the CA environment) for which A/N feedback is required may be indicated by a counter-DAI bit/field, a total-DAI bit/field, and/or an NFI for current-ID bit/field, and/or information about the NFI for Type-3 may be signaled.
4. In a second method, when it is indicated by DCI that A/N feedback transmission is required only for one (PDSCH) slot group related to the current-ID, the CTI information may be signaled by a total-DAI for feedback-ID (or total-DAI for other-ID) bit/field. When the CTI indicates Type-3, a HARQ process ID group and/or a cc/cell group (in the CA environment) for which A/N feedback is required may be indicated by a counter-DAI bit/field, a total-DAI (for current-ID) bit/field, an NFI for current-ID bit/field, and/or an NFI for feedback-ID (or NFI for other-ID) bit/field, and/or information about the NFI for Type-3 may be signaled.

D. DL scheduling based on fallback DCI
i. Basically, fallback DCI formats may include/signal only the current-ID information and counter-DAI information (for the (PDSCH) slot group related to the corresponding ID) among the basic information (such a case is referred to as Case 1).
ii. Alternatively, the fallback DCI format may include/signal all basic information except a total-DAI for current-ID.
iii. In this case, for information that is not included/signaled by the fallback DCI, the UE may configure/transmit an A/N codebook (payload) based on the most recently detected/received information from non-fallback DL DCI (e.g., feedback-ID (or total-ID), NFI, CTI, etc.). The non-fallback DL DCI related to the recently detected/received information may be limited only to DCI indicating the same HARQ-ACK (PUCCH) transmission time as a HARQ-ACK (PUCCH) transmission time (or slot) indicated by the fallback DL DCI. If there is no non-fallback DCI indicating the same HARQ-ACK (PUCCH) transmission time as the fallback DCI, the UE may configure/transmit A/N feedback only for the slot group related to the current-ID as in Case 1. In addition, the UE may assume/apply toggling (or non-toggling) for the NFI for current-ID (compared to the previous A/N feedback or previously (recently) received NFI bit). Further, the UE may operate by assuming that the Type-2a codebook is indicated by the CTI.

E. DL transmission operation on CBG basis
i. For a CC/cell where DL transmission is configured on a CBG basis, an A/N sub-codebook where information about the total-DAI for feedback-ID (or total-DAI for other-ID) is transmitted for each TB and an A/N sub-codebook where the information is transmitted for each CBG may be separately signaled.

2) Information Signaled in UL Grant DCI
A. Basically, the following information may be included (basic information).
i. Information about a total-DAI for a first (PDSCH) slot group ID (first-ID)
ii. Information about a total-DAI for a second (PDSCH) slot group ID (second-ID)
iii. Notes
1. For example, when a maximum of two (PDSCH) slot groups (indices=0 and 1) are defined/configured, the first-ID and second-ID may correspond to slot group indices 0 and 1, respectively.
2. In another example, the current-ID and feedback-ID (or other-ID) may be set/replaced to/with the first-ID and the second-ID, respectively. In this case, information about the current-ID and information about the feedback-ID (or total-ID) may be further signaled by DCI.
A. DCI may include the total-ID rather than the feedback-ID, and the feedback-ID information may be determined according to Method 1.
B. A slot group ID having a different value from the current-ID may be determined as the other-ID according to Method 2.
3. As a further example, bitmap information about a set of all slot group IDs/indices (e.g., IDs/indices=0 and 1) may be signaled by DCI. Whether A/N feedback is required for a slot group corresponding to each ID may be indicated for each slot group ID by the corresponding bitmap.
4. The UL grant DCI may include no slot group ID/index-related information/signaling. In this case, the UE may configure/transmit an A/N codebook (payload) based on the most recently detected/received slot group ID/index information from the DL grant DCI. The DL grant DCI related to slot group IDs/indices may be limited only to DCI indicating the same PDSCH HARQ-ACK transmission time as a PUSCH transmission time (slot) scheduled by the UL grant DCI.

B. Additionally, the following information may be further included.
i. Information about an NFI related to A/N feedback related to the first-ID
ii. Information about an NFI related to A/N feedback related to the second-ID
iii. Notes
1. In this case, even if there is no additional DL (PDSCH) scheduling/transmission from the BS, the UE may be configured with A/N feedback transmission (over the PUSCH).
2. Otherwise, the UL grant DCI may include no NFI information about A/N feedback. In this case, the UE may configure/transmit an A/N codebook (payload) based on the most recently detected/received NFI information from the DL grant DCI (for each (PDSCH) slot group). The DL grant DCI related to the NFI information may be limited only to DCI indicating the same PDSCH HARQ-ACK transmission time as a PUSCH transmission time (slot) scheduled by the UL grant DCI.

C. Additionally, the following information may be further included.
i. Information on whether A/N feedback is configured/transmitted based on the Type-3 codebook (e.g., information on which one of the Type-2a and Type-3 A/N codebooks is used)

ii. Notes
1. If Type-3 is indicated by DCI (at a specific time), the information about an NFI related to A/N feedback based on the Type-3 codebook may be additionally signaled by the corresponding DCI.

D. UL scheduling based on fallback DCI i. Basically, fallback DCI formats may not include/signal all basic information (all basic information may be dropped).

ii. Alternatively, the fallback DCI formats may include/signal all basic information.

iii. In this case, for information that is not included/signaled by the UL grant DCI, the UE may configure/transmit an A/N codebook (payload) based on the most recently detected/received information from the DL grant DCI (e.g., slot group ID/index, NFI, CTI, etc.) In this case, the DL grant DCI related to the recently detected/received information may be limited only to DCI indicating the same PDSCH HARQ-ACK transmission time as a PUSCH transmission time (or slot) scheduled by the UL grant DCI.

iv. When A/N is piggybacked on a configured grant PUSCH (CG-PUSCH), which is transmitted in the form of a CG without DCI, instead of scheduling with dynamic grant DCI transmission, the UE may configure/transmit an A/N codebook (payload) based on the most recently detected/received information from the DL grant DCI (e.g., slot group ID/index, total-DAI, NFI, CTI, etc.). The DL grant DCI related to the recently detected/received information may be limited only to DCI indicating the same PDSCH HARQ-ACK transmission time as a CG-PUSCH transmission time (slot).

E. DL transmission operation on CBG basis i. For a CC/cell where DL transmission is configured on a CBG basis, an A/N sub-codebook where information about the total-DAI (e.g., total-DAI for first-ID and total-DAI for second-ID) is transmitted for each TB and an A/N sub-codebook where the information is transmitted for each CBG may be separately signaled.

When the UE configures/transmits A/N feedback over the PUCCH/PUSCH based on Type-2a codebook, the BS may need to notify/inform the UE that no A/N feedback is piggybacked on the PUSCH. To this end, the following DCI signaling and operations may be considered.

1) Method 1

A. The UE may not perform A/N piggyback on the PUSCH in the following case: when total-DAI bits in the UL grant DCI are set to '11' (or when the total-DAI value is set to 4); when no DL grant DCI is detected within a bundling window related to a PUSCH transmission time (or a time period from a previous (recent) A/N feedback transmission time (or an indicated transmission time) to the PUSCH transmission time; and when the NFI bit indicated by the UL grant DCI is toggled (compared to the previous A/N feedback or previously (recently) received NFI bit). This method may be applied when NFI information is signaled by the UL grant DCI. In this case, the DCI checking and UE operations therefor may be performed independently/separately for each (PDSCH) slot group (ID).

B. As another method, the UE may apply/perform the DCI checking/UE operations to/for the detected/received UL grant DCI (when no NFI information is signaled by the UL grant DCI), and the UE may assume that the NFI bit is non-toggled (or toggled) (compared to the previous A/N feedback or previously (recently) received NFI bit). This method may be applied when the UL grant DCI (format) has no NFI information signaling (e.g., fallback UL grant DCI).

2) Method 2

A. One of the states signaled by a total-DAI field in the UL grant DCI may be defined such that it indicates that there is no A/N feedback (piggybacked on the PUSCH). When the corresponding state is indicated by the DCI, the UE may not perform A/N piggyback on the PUSCH. This method may be applied when no NFI information is signaled by the UL grant DCI. In this case, the DCI checking and UE operations therefor may be performed independently/separately for each (PDSCH) slot group (ID).

3) Method 3

A. Only one (PDSCH) slot group (e.g., first-ID) may be indicated by first-ID and second-ID (or current-ID and feedback-ID (or total-ID)) bits/fields in the UL grant DCI. In this case, a specific total-DAI field (e.g., total-DAI field for second-ID) may indicate: 1) A/N feedback for the indicated one slot group (e.g., first-ID) needs to be configured/transmitted (through piggyback on the PUSCH); or 2) there is no A/N feedback piggybacked on the PUSCH even for the indicated one slot group (e.g., first-ID) (that is, for all slot groups (first ID and second-ID)). This method may be applied when (PDSCH) slot group ID information is signaled by the UL grant DCI (and no NFI information is signaled by the UL grant DCI). For example, the slot group ID information may include information about the first-ID and second-ID (or information about the current-ID and feedback-ID (or total-ID)).

When a plurality of PUSCH resources transmitted in multiple slots are scheduled/indicated by one piece of UL grant DCI (i.e., multi-slot scheduling), how to apply total-DAI, NFI, and/or CTI information signaled by the corresponding DCI may need to be considered. The corresponding information may be applied to 1) (a) a PUSCH resource in the first slot (i.e., first-slot PUSCH), (b) a first PUSCH resource (i.e., first PUSCH), (c) a first PUSCH resource including a specific number or more of symbols (or non-DMRS symbols) and/or a specific number or more of RBs (REs or non-DMRS REs), (d) a PUSCH resource allocated to a slot immediately after a first slot for PUSCH transmission, or (e) a first PUSCH resource having the same symbol duration as a slot duration (i.e., first-full PUSCH) among a plurality of slots or PUSCH resources scheduled by DCI (for example, the information may be applied to a specific one of the plurality of resources or a specific resource combination thereof); 2) (a) a first slot PUSCH where initial LBT (or CCA) is successful, (b) the first PUSCH, or (c) the first full-PUSCH; or 3) (a) a first-slot PUSCH where A/N feedback is transmitted through piggyback, (b) the first PUSCH, or (c) the first full-PUSCH. For the remaining slots or PUSCH resources except the above slots or PUSCH resources, a) an A/N codebook (payload) may be configured/transmitted based on the most recently detected/received information from the DL grant DCI (e.g., slot group ID/index, total-DAI, NFI, CTI, information on whether fallback A/N is required, and/or information on whether there is pending A/N) and/or b) a specific value (e.g., default value) may be applied/assumed to/for the information.

In the case of a), the DL grant DCI related to the recently detected/received information may be limited only to DCI indicating that a PUSCH transmission time (slot) is equal to a PDSCH HARQ-ACK transmission. In the case of b), the following assumption may be applied to at least one of the information.

1) For the total-DAI, it is assumed/applied that the total-DAI bits are 11 (or the total-DAI value is 4).
2) For the NFI, it is assumed/applied that the NFI bit is toggled (or non-toggled) (compared to the previous A/N feedback or previously (recently) received NFI bit).
3) For the CTI, it is assumed/applied that the Type-2a codebook is indicated (or the Type-1 codebook is indicated in the following case).
4) For information on whether A/N feedback is based on the Type-1 codebook, it is assumed/applied that the corresponding field/signaling is not present.
5) For the information on whether there is pending A/N, it is assumed/applied that A/N feedback is not pending.

(b) DCI Configuration and Signaling Information in Configuration of Type-1 A/N Codebook 1) Information Signaled in DL Grant DCI
A. Basically, the following information may be included (basic information).
i. Information on whether there is fallback A/N
ii. Notes
1. The information may indicate whether only one piece of fallback DCI scheduling a PCell (or PDSCH transmission thereon) is transmitted within one bundling window. The information may be configured/signaled with only 1 bit.
B. Additionally, the following information may be further included.
i. Information on whether A/N feedback is configured/transmitted based on the Type-3 codebook (e.g., a CTI indicating which one of the Type-1 and Type-3 A/N codebooks is used)
ii. Notes
1. If Type-3 is indicated by DCI (at a specific time), information about an NFI related to A/N feedback based on the Type-3 codebook may be additionally signaled by the corresponding DCI.
C. Additionally, the following information may be further included.
i. Information on whether there is pending A/N
ii. Notes
1. The information may indicate whether final A/N feedback is configured by further including A/N where pending is indicated (at a previous time point) (i.e., pending A/N) in an A/N payload configured based on the Type-1 codebook.
D. DL scheduling based on fallback DCI
i. Basically, corresponding DCI formats (at least related to a PCell/PSCell) may include/signal the basic information.
ii. Additionally, fallback DCI formats related to an SCell (except the PCell/PSCell) may not include/signal the basic information.
E. DL transmission operation on CBG basis
i. For a CC/cell where DL transmission is configured on a CBG basis or for CA including the CC/cell where DL transmission is configured on a CBG basis, the pending A/N payload may be determined based on the maximum number of (transmittable) CBGs configured for all cells/CCs, that is, the maximum of the numbers of (transmittable) CBGs configured per cell/CC. For a CC/cell where transmission is configured on a TB basis or for aggregation of only CCs/cells where transmission is configured on a TB basis, the pending A/N payload may be determined based on the maximum number of (transmittable) TBs configured for all cells/CCs, that is, the maximum of the numbers of (transmittable) TBs configured per cell/CC.

2) Information Signaled in UL Grant DCI
A. Basically, the following information may be included (basic information).
i. Information on whether A/N feedback is based on the Type-1 codebook
ii. Notes
1. The information may indicate whether the A/N payload configured based on the Type-1 codebook is transmitted through piggyback on the PUSCH (it may be further indicated whether only fallback A/N is piggybacked or zero bits are transmitted (piggyback drop)).
B. Additionally, the following information may be further included.
i. Information on whether A/N feedback is configured/transmitted based on the Type-3 codebook (e.g., information on which one of the Type-2a and Type-3 A/N codebooks is used)
ii. Notes
1. If Type-3 is indicated by DCI (at a specific time), information about an NFI related to A/N feedback based on the Type-3 codebook may be additionally signaled by the corresponding DCI.
C. Additionally, the following information may be further included.
i. Information on whether there is pending A/N
ii. Notes
1. The information may indicate whether final A/N feedback is configured by further including A/N where pending is indicated (at a previous time point) (i.e., pending A/N) in the A/N payload configured based on the Type-1 codebook.
D. UL scheduling based on fallback DCI
i. Basically, fallback DCI formats may not include/signal the basic information.
ii. For information that is not included/signaled by the UL grant DCI, the UE may configure/transmit an A/N codebook (payload) based on the most recently detected/received information from the DL grant DCI (e.g., information on whether there is fallback A/N, CTI, information on whether there is pending A/N, etc.). In this case, the DL grant DCI related to the recently detected/received information may be limited only to DCI indicating the same PDSCH HARQ-ACK transmission time as a PUSCH transmission time (or slot) scheduled by the UL grant DCI.
iii. A/N may be piggybacked on the CG-PUSCH, which is transmitted in the form of a CG without DCI, instead of scheduling with dynamic grant DCI transmission. In this case, the UE may configure/transmit an A/N codebook (payload) based on the most recently detected/received information from the DL grant DCI (e.g., information on whether there is fallback A/N, CTI, information on whether there is pending A/N, etc.). The DL grant DCI related to the recently detected/received information may be limited only to DCI indicating the same PDSCH HARQ-ACK transmission time as a CG-PUSCH transmission time (slot).
E. DL transmission operation on CBG basis
i. Similarly to the above-described DL grant DCI case, the pending A/N payload may be determined based on the maximum number of (transmittable) CBGs or TBs configured for all cells/CCs.

The DL/UL grant DCI configuration and signaling operation (based on the Type-2a or Type-1 A/N codebook configuration) (including the Type-2a or Type-1 A/N codebook configuration) may be applied only to a PUCCH cell/CC configured for PUSCCH transmission in the CA environment (e.g., PCell or PSCell) operates in a U-band. In this case, DL/UL grant DCI related to all cells/CCs for the CA may be configured according to the methods proposed in the present disclosure. If the PUCCH cell/CC operates in an L-band, the conventional DL/UL grant DCI configuration and signaling operation may be applied (if the conventional Type-1 or Type-2 A/N codebook is configured). In this case, DL/UL grant DCI related to all aggregated cells/CCs may be the same as in the prior art.

As another method, the Type-2a or Type-1 A/N codebook configuration and the DL/UL grant DCI configuration/signaling based thereon may be applied only when a cell/CC operating in a U-band is included in multiple carriers configured for the UE, i.e., a set of cells/CCs configured for the CA. In this case, DL/UL grant DCI related to all aggregated cells/CCs may be configured according to the proposed methods. When the multiple carriers consist of only cells/CCs operating in L-bands, the conventional Type-1 or Type-2 A/N codebook configuration and the conventional DL/UL grant DCI configuration/signaling based thereon may be applied. In this case, DL/UL grant DCI related to all aggregated cells/CCs may be the same as in the prior art.

The UE may perform a network access process to perform the above-described/proposed procedures and/or methods. For example, the UE may receive and store system information and configuration information required to perform the above-described/proposed procedures and/or methods during network access (e.g., BS access). The configuration information required for the present disclosure may be received by higher-layer signaling (e.g., RRC signaling or MAC-layer signaling).

Figure 16:
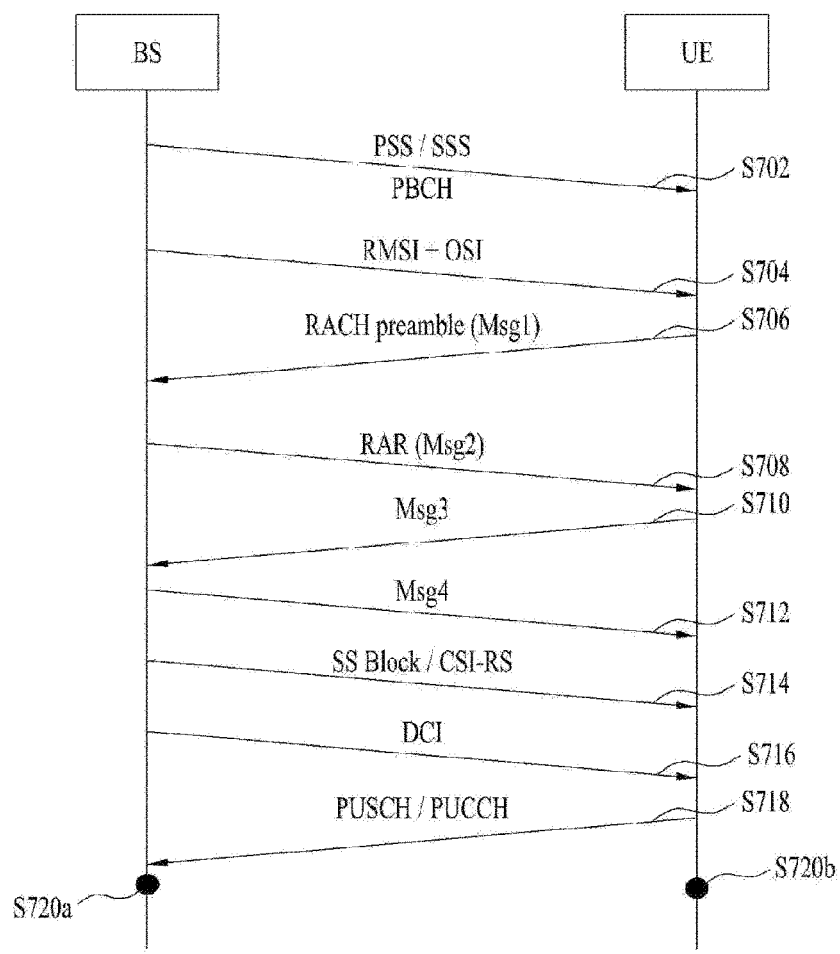
FIG. 16 illustrates an initial access procedure applicable to the present disclosure.

FIG. 16 is a diagram illustrating an initial network access and subsequent communication process. In NR, a physical channel and an RS may be transmitted by beamforming. When beamforming-based signal transmission is supported, beam management may follow, for beam alignment between a BS and a UE. Further, a signal proposed by the present disclosure may be transmitted/received by beamforming. In RRC IDLE mode, beam alignment may be performed based on an SSB, whereas in RRC CONNECTED mode, beam alignment may be performed based on a CSI-RS (in DL) and an SRS (in UL). On the contrary, when beamforming-based signal transmission is not supported, beam-related operations in the following description may be skipped.

Referring to FIG. 16, a BS (e.g., eNB) may periodically transmit an SSB (S702). The SSB includes a PSS/SSS/PBCH. The SSB may be transmitted by beam sweeping (see FIG. D5). The PBCH may include a master information block (MSB), and the MIB may include scheduling information for remaining minimum system information (RMSI). The BS may then transmit the RMSI and other system information (OSI) (S704). The RMSI may include information required for initial access to the BS (e.g., PRACH configuration information). After detecting SSBs, the UE identifies the best SSB. The UE may then transmit an RACH preamble (Message 1; Msg1) in PRACH resources linked/corresponding to the index (i.e., beam) of the best SSB (S706). The beam direction of the RACH preamble is associated with the PRACH resources. Association between PRACH resources (and/or RACH preambles) and SSBs (SSB indexes) may be configured by system information (e.g., RMSI). Subsequently, in an RACH procedure, the BS may transmit a random access response (RAR) (Msg2) in response to the RACH preamble (S708), the UE may transmit Msg3 (e.g., RRC Connection Request) based on a UL grant included in the RAR (S710), and the BS may transmit a contention resolution message (Msg4) (S720). Msg4 may include RRC Connection Setup.

When an RRC connection is established between the BS and the UE in the RACH procedure, beam alignment may subsequently be performed based on an SSB/CSI-RS (in DL) and an SRS (in UL). For example, the UE may receive an SSB/CSI-RS (S714). The SSB/CSI-RS may be used for the UE to generate a beam/CSI report. The BS may request the UE to transmit a beam/CSI report, by DCI (S716). In this case, the UE may generate a beam/CSI report based on the SSB/CSI-RS and transmit the generated beam/CSI report to the BS on a PUSCH/PUCCH (S718). The beam/CSI report may include a beam measurement result, information about a preferred beam, and so on. The BS and the UE may switch beams based on the beam/CSI report (S720a and S720b).

Subsequently, the UE and the BS may perform the above-described/proposed procedures and/or methods. For example, the UE and the BS may transmit a wireless signal by processing information stored in a memory or may process a received wireless signal and store the processed signal in a memory according to the proposal of the present disclosure, based on configuration information obtained in a network access process (e.g., a system information acquisition process, an RRC connection process on an RACH, and so on). The wireless signal may include at least one of a PDCCH, a PDSCH, or an RS on DL and at least one of a PUCCH, a PUSCH, or an SRS on UL.

Figure 17:
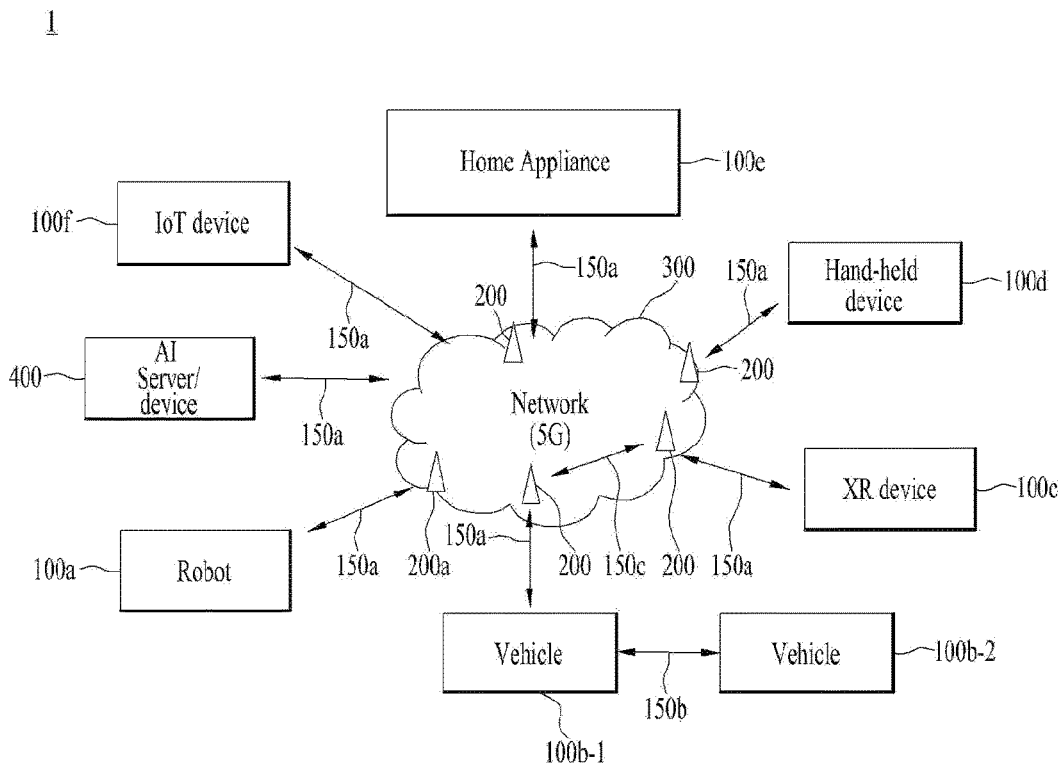
FIGS. 17 to 20 illustrate a communication system 1 applied to the present disclosure.

FIG. 17 illustrates a communication system 1 applied to the present disclosure.

Referring to FIG. 17, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 18:
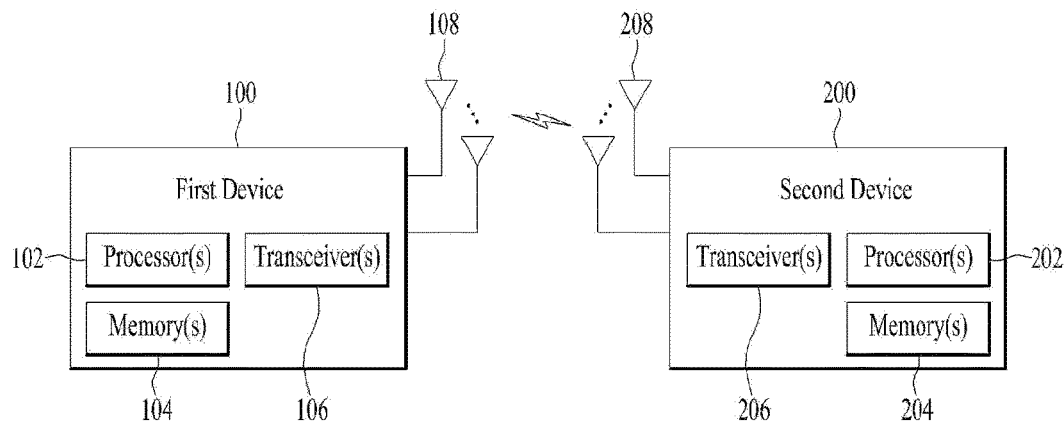

FIG. 18 illustrates wireless devices applicable to the present disclosure.

Referring to FIG. 18, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 19:
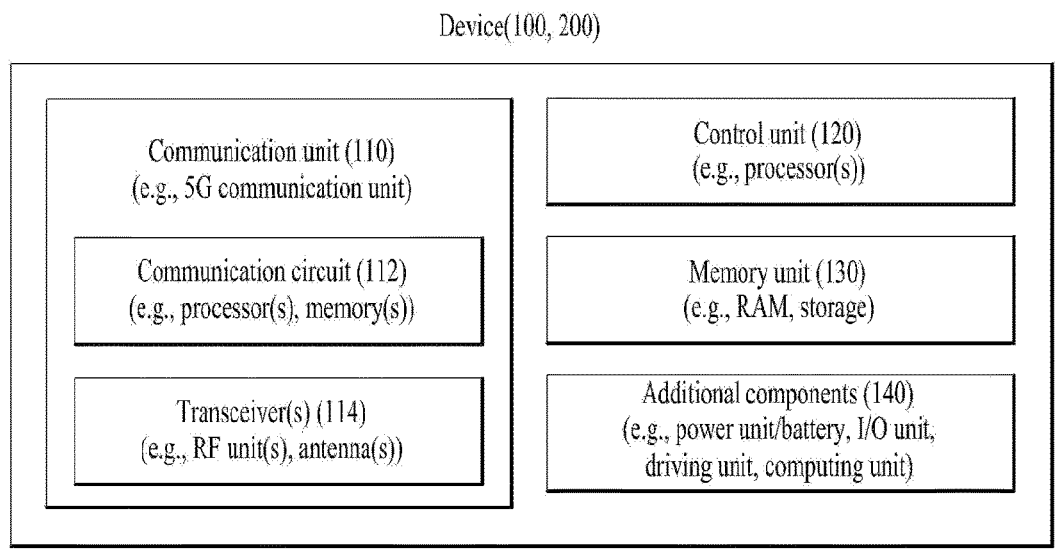

FIG. 19 illustrates another example of a wireless device applied to the present disclosure. The wireless device may be implemented in various forms according to a use case/service (refer to FIG. 17).

Referring to FIG. 19, wireless devices 100 and 200 may correspond to the wireless devices 100 and 200 of FIG. 17 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcasting terminal, a hologram device, a public safety device, an MTC device, a medical device, a FinTech device (or a finance device), a security device, a climate/environment device, the AI server/device (400 of FIG. 17), the BSs (200 of FIG. 17), a network node, or the like. The wireless device may be mobile or fixed according to a use case/service.

In FIG. 19, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 20:
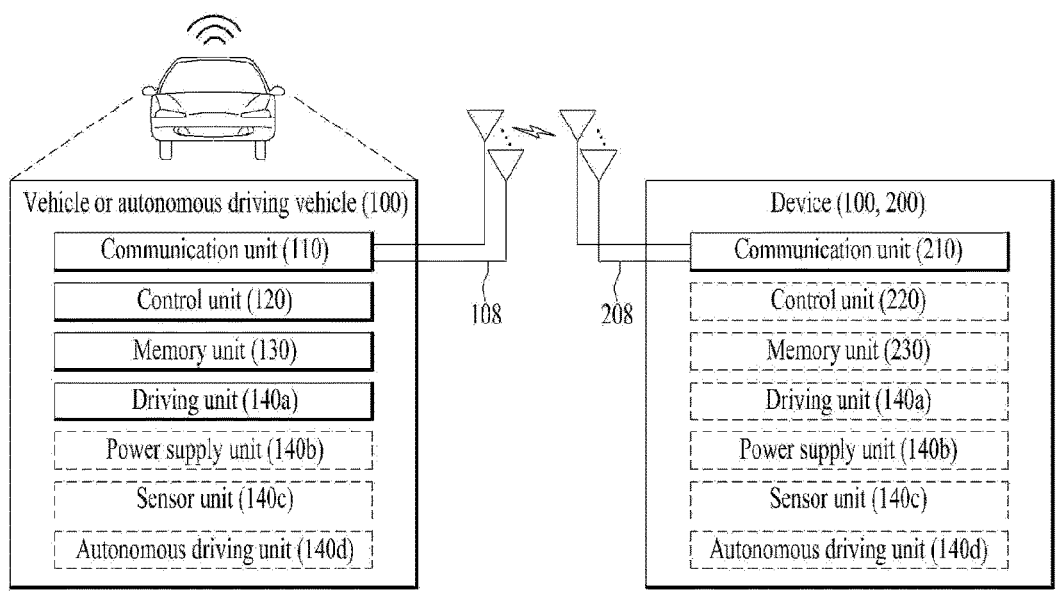

FIG. 20 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 20, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The above-described embodiments are combinations of elements and features of the present disclosure in prescribed forms. The elements or features may be considered as selective unless specified otherwise. Each element or feature may be implemented without being combined with other elements or features. Further, the embodiment of the present disclosure may be constructed by combining some of the elements and/or features. The order of the operations described in the embodiments of the present disclosure may be modified. Some configurations or features of any one embodiment may be included in another embodiment or replaced with corresponding configurations or features of the other embodiment. It is obvious to those skilled in the art that claims that are not explicitly cited in each other in the appended claims may be presented in combination as an embodiment of the present disclosure or included as a new claim by a subsequent amendment after the application is filed.

It will be appreciated by those skilled in the art that the present disclosure can be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to a UE, a BS, or other devices of a wireless mobile communication system.

What is claimed is:

1. A method of transmitting a signal by an apparatus in a wireless communication system, the method comprising:
   receiving first Downlink Control Information (DCI) that schedules a first Physical Downlink Shared Channel (PDSCH), the first DCI including a first counter-Downlink Assignment Index (DAI) related to a first PDSCH group for the first PDSCH;
   receiving the first PDSCH based on the first DCI;
   receiving second DCI that schedules a second PDSCH, the second DCI including a second counter-DAI related to a second PDSCH group for the second PDSCH;
   receiving the second PDSCH based on the second DCI;
   receiving third DCI including i) a first total-DAI related to the first PDSCH group and ii) a second total-DAI related to the second PDSCH group; and
   transmitting Uplink Control Information (UCI) in an uplink channel based on the third DCI, the UCI including i) a first Hybrid Automatic Repeat Request Acknowledgement (HARQ-ACK) information for the first PDSCH group based on the first total-DAI and ii) a second HARQ-ACK information for the second PDSCH group based on the second total-DAI.

2. The method of claim 1, wherein the third DCI does not include identification information for the first PDSCH group and the second PDSCH group,
wherein the first DCI includes identification information for the first PDSCH group, and
wherein the second DCI includes identification information for the second PDSCH group.

3. The method of claim 1, wherein the second DCI includes a third total-DAI for the first PDSCH group.

4. The method of claim 1, wherein the second DCI includes a fourth total-DAI for the second PDSCH group.

5. The method of claim 1, wherein the third DCI includes information related to a transmission timing of the UCI.

6. The method of claim 1, wherein the UCI is transmitted via an unlicensed band.

7. An apparatus configured to transmit a signal in a wireless communication system, the apparatus comprising:
at least one processor; and
at least one computer memory operably connectable to the at least one processor and storing instructions that, when executed by the at least one processor, perform operations comprising:
receiving first Downlink Control Information (DCI) that schedules a first Physical Downlink Shared Channel (PDSCH), the first DCI including a first counter-Downlink Assignment Index (DAI) related to a first PDSCH group for the first PDSCH;
receiving the first PDSCH based on the first DCI;
receiving second DCI that schedules a second PDSCH, the second DCI including a second counter-DAI related to a second PDSCH group for the second PDSCH;
receiving the second PDSCH based on the second DCI;
receiving third DCI including i) a first total-DAI related to the first PDSCH group and ii) a second total-DAI related to the second PDSCH group; and
transmitting Uplink Control Information (UCI) in an uplink channel based on the third DCI, the UCI including i) a first Hybrid Automatic Repeat Request Acknowledgement (HARQ-ACK) information for the first PDSCH group based on the first total-DAI and ii) a second HARQ-ACK information for the second PDSCH group based on the second total-DAI.

8. The apparatus of claim 7, wherein the third DCI does not include identification information for the first PDSCH group and the second PDSCH group,
wherein the first DCI includes identification information for the first PDSCH group, and
wherein the second DCI includes identification information for the second PDSCH group.

9. The apparatus of claim 7, wherein the second DCI includes a third total-DAI for the first PDSCH group.

10. The apparatus of claim 7, wherein the second DCI includes a fourth total-DAI for the second PDSCH group.

11. The apparatus of claim 7, wherein the third DCI includes information related to a transmission timing of the UCI.

12. The apparatus of claim 7, wherein the UCI is transmitted via an unlicensed band.

13. The method of claim 1, wherein the third DCI is a UL grant DCI that schedules the uplink channel.

14. The apparatus of claim 7, wherein the third DCI is a UL grant DCI that schedules the uplink channel.

15. An apparatus configured to receive a signal in a wireless communication system, the apparatus comprising:
at least one processor; and
at least one computer memory operably connectable to the at least one processor and storing instructions that, when executed by the at least one processor, perform operations comprising:
transmitting first Downlink Control Information (DCI) that schedules a first Physical Downlink Shared Channel (PDSCH), the first DCI including a first counter-Downlink Assignment Index (DAI) related to a first PDSCH group for the first PDSCH;
transmitting the first PDSCH based on the first DCI;
transmitting second DCI that schedules a second PDSCH, the second DCI including a second counter-DAI related to a second PDSCH group for the second PDSCH;
transmitting the second PDSCH based on the second DCI;
transmitting third DCI including i) a first total-DAI related to the first PDSCH group and ii) a second total-DAI related to the second PDSCH group; and
receiving Uplink Control Information (UCI) in an uplink channel based on the third DCI, the UCI including i) a first Hybrid Automatic Repeat Request Acknowledgement (HARQ-ACK) information for the first PDSCH group based on the first total-DAI and ii) a second HARQ-ACK information for the second PDSCH group based on the second total-DAI.

16. The apparatus of claim 15, wherein the third DCI does not include identification information for the first PDSCH group and the second PDSCH group,
wherein the first DCI includes identification information for the first PDSCH group, and
wherein the second DCI includes identification information for the second PDSCH group.

17. The apparatus of claim 15, wherein the second DCI includes a third total-DAI for the first PDSCH group.

18. The apparatus of claim 15, wherein the second DCI includes a fourth total-DAI for the second PDSCH group.

19. The apparatus of claim 15, wherein the third DCI includes information related to a transmission timing of the UCI.

20. The apparatus of claim 15, wherein the third DCI is a UL grant DCI that schedules the uplink channel.

* * * * *